US009842180B2

(12) United States Patent
Hsu et al.

(10) Patent No.: US 9,842,180 B2
(45) Date of Patent: Dec. 12, 2017

(54) NOC TIMING POWER ESTIMATING DEVICE AND METHOD THEREOF

(71) Applicant: INDUSTRIAL TECHNOLOGY RESEARCH INSTITUTE, Hsinchu (TW)

(72) Inventors: Ting-Shuo Hsu, Magong (TW); Jing-Jia Liou, Hsinchu (TW); Jih-Sheng Shen, Tainan (TW); Juin-Ming Lu, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 189 days.

(21) Appl. No.: 14/585,864

(22) Filed: Dec. 30, 2014

(65) Prior Publication Data
US 2016/0149780 A1 May 26, 2016

(30) Foreign Application Priority Data
Nov. 24, 2014 (TW) .............................. 103140607 A

(51) Int. Cl.
G06F 17/50 (2006.01)
G06F 15/78 (2006.01)
G06F 1/32 (2006.01)

(52) U.S. Cl.
CPC ............ G06F 17/5045 (2013.01); G06F 1/32 (2013.01); G06F 15/7825 (2013.01); Y02B 60/1207 (2013.01); Y02B 60/1225 (2013.01)

(58) Field of Classification Search
None
See application file for complete search history.

(56) References Cited

U.S. PATENT DOCUMENTS

| 5,933,358 A | 8/1999 | Koh et al. |
| 6,865,526 B1 | 3/2005 | Henkel et al. |

(Continued)

FOREIGN PATENT DOCUMENTS

| CN | 101227298 A | 7/2008 |
| CN | 102437953 A | 5/2012 |

(Continued)

OTHER PUBLICATIONS

Eisley et al. "High Level Power Analysis for On-Chip Networks." Department of Electrical Engineering, Princeton University. 2004.*

(Continued)

*Primary Examiner* — Andrew Oh
(74) *Attorney, Agent, or Firm* — Birch, Stewart, Kolasch & Birch, LLP

(57) ABSTRACT

A NoC timing power estimating method includes: estimating a plurality of transmission timing of a plurality of transmission units of at least a packet, the transmission timing indicating respective time points at which the transmission units enter/leave a plurality of passing elements of the NoC; based on the transmission timing of the transmission units, estimating respective circuit states and respective power states of the passing elements of the NoC, the circuit state indicating an operation state of the passing element and the power state being related to the circuit state; and based on the power states of the passing elements of the NoC, estimating power consumption of the NoC.

24 Claims, 16 Drawing Sheets

(56) References Cited

U.S. PATENT DOCUMENTS

| | | | |
|---|---|---|---|
| 7,971,082 B2 | 6/2011 | Mathur et al. | |
| 8,510,694 B2 | 8/2013 | Hsieh et al. | |
| 8,930,647 B1* | 1/2015 | Smith | G06F 9/44557 |
| | | | 711/103 |
| 9,042,397 B2* | 5/2015 | Ramanujam | H04L 12/4637 |
| | | | 370/413 |
| 9,432,298 B1* | 8/2016 | Smith | H04L 49/9057 |
| 2004/0083299 A1* | 4/2004 | Dietz | G06F 17/30985 |
| | | | 709/230 |
| 2005/0015689 A1* | 1/2005 | Eppensteiner | G01R 31/31858 |
| | | | 714/724 |
| 2006/0080076 A1 | 4/2006 | Lahiri et al. | |
| 2007/0276645 A1 | 11/2007 | Veller et al. | |
| 2008/0077897 A1 | 3/2008 | Ushiyama | |
| 2009/0158063 A1 | 6/2009 | Wang et al. | |
| 2010/0094990 A1* | 4/2010 | Ben-Yehuda | G06F 11/3409 |
| | | | 709/224 |
| 2011/0026405 A1* | 2/2011 | Takagi | H04L 45/00 |
| | | | 370/235 |
| 2011/0035203 A1 | 2/2011 | Dalton et al. | |
| 2012/0057467 A1* | 3/2012 | Yoshida | H04L 47/283 |
| | | | 370/238 |
| 2012/0108327 A1* | 5/2012 | Tandon | H04L 67/125 |
| | | | 463/29 |
| 2012/0195322 A1* | 8/2012 | Ramanujam | H04L 12/4637 |
| | | | 370/413 |
| 2012/0303322 A1 | 11/2012 | Rego et al. | |
| 2013/0007255 A1* | 1/2013 | Gerber | G06F 11/302 |
| | | | 709/224 |
| 2013/0051397 A1* | 2/2013 | Guo | H04L 45/00 |
| | | | 370/400 |
| 2013/0080141 A1 | 3/2013 | Lee et al. | |
| 2013/0294458 A1* | 11/2013 | Yamaguchi | G06F 15/7825 |
| | | | 370/412 |
| 2014/0107999 A1 | 4/2014 | Frenkil | |
| 2015/0146697 A1* | 5/2015 | Gibbon | H04W 52/30 |
| | | | 370/336 |
| 2015/0149592 A1* | 5/2015 | Gibbon | H04L 67/325 |
| | | | 709/219 |
| 2015/0236963 A1* | 8/2015 | Kumar | H04L 47/19 |
| | | | 370/235 |
| 2015/0304949 A1* | 10/2015 | Coster | H04W 52/0235 |
| | | | 370/311 |
| 2016/0212012 A1* | 7/2016 | Young | H04L 41/14 |

FOREIGN PATENT DOCUMENTS

| | | |
|---|---|---|
| TW | 201248420 A | 12/2012 |
| TW | 201314443 A | 4/2013 |

OTHER PUBLICATIONS

Hayenga et al. "The NoX Router." Department of Electrical and Compture Engineering, University of Wisconsin—Madison. 2011.*

Eisley et al., "HighLevel Power Analysis for OnChip Networks", CASES'04, Sep. 22-25, 2004, pp. 104-115.

Hsu et al., "PowerDepot: Integrating IP-Based Power Modeling with ESL Power Analysis for Multi-Core SoC Designs", DAC'11, Jun. 5-10, 2011, pp. 47-52.

Kahng et al., "Comprehensive Modeling Methodologies for NoC Router Estimation", IEEE Transactions on Computer-Aided Design of Integrated Circuits and Systems, 2012, pp. 1-20.

Lee et al., "A high level power model for Network-on-Chip (NoC) router", Computers and Electrical Engineering, Vo. 35, 2009, pp. 837-845.

Ost et al., "Exploring NoC-Based MPSoC Design Space with Power Estimation Models", IEEE Design & Test of Computers, Power Estimation Models to Design NoC-Based MPSoCs, 2011, pp. 16-29.

Schürmans et al., "Creation of ESL Power Models for Communication Architectures using Automatic Calibration", DAC '13, May 29-Jun. 7, 2013, 6 pages.

Agarwal et al., "GARNET: A Detailed On-Chip Network Model inside a Full-System Simulator", Department of Electrical Engineering, Princeton University, Princeton, NJ, 08544, 2009, 10 Pages.

Ngo et al., "Realizing Network on Chip Design of H.264 Decoder Based on Throughput Aware Mapping", System VLSI Lab, SITI Research Center, Information and Communications University, Daejeon City, Korea, 2006, pp. 337-342.

Nicopoulos et al., "ViChaR: A Dynamic Virtual Channel Regulator for Network-on-Chip Routers", The 39th Annual IEEE/ACM International Symposium on Microarchitecture (MICRO' 06), IEEE, 2006, 12 Pages.

Srinivasan et al., "Linear-Programming-Based Techniques for Synthesis of Network-on-Chip Architectures", IEEE Transactions on Very Large Scale Integration (VLSI) Systems, Apr. 2006, vol. 14, No. 4, pp. 407-420.

* cited by examiner

NOC TIMING POWER ESTIMATING DEVICE AND METHOD THEREOF

This application claims the benefit of Taiwan application Serial No. 103140607, filed Nov. 24, 2014, the disclosure of which is incorporated by reference herein in its entirety.

TECHNICAL FIELD

The disclosure relates in general to a network-on-chip (NoC) timing power estimating device and a method thereof.

BACKGROUND

Due to high production and producibility, multi-core architecture has become a mainstream architecture. As the number of system cores increases, the network-on-chip (NoC) has been gradually used in the multi-core system. The NoC may consume a considerable amount of power and has a wide range in variation of dynamic power. During data transmission, the dynamic power of the NoC may even be more than two times of the static power of the NoC. Thus, the analysis on the dynamic power of the NoC is crucial to the system standard.

SUMMARY

The disclosure is directed to a NoC timing power estimating device and a method thereof, capable of calculating NoC cycle timing to obtain power estimation.

According to one embodiment of the disclosure, a network-on-chip (NoC) timing power estimation method is disclosed. A plurality of transmission timings of a plurality of transmission units of at least a packet are estimated, wherein the transmission timings indicate respective time points at which the transmission units enter/leave a plurality of traversed elements of the NoC. Respective circuit state and power state of each traversed element of the NoC are estimated according to the transmission timings of the transmission units, wherein the circuit state indicates an operation state of the traversed element, and the power state is related to the circuit state. Power consumption of the NoC is estimated according to the power states of the traversed elements of the NoC.

According to another embodiment of the disclosure, a NoC timing power estimating device is disclosed. The NoC timing power estimating device includes a transmission timing calculation unit, an element power state calculation unit and a power estimating unit. The transmission timing calculation unit estimates a plurality of transmission timings of a plurality of transmission units of at least a packet, wherein the transmission timings indicate respective time points at that the transmission units enter/leave a plurality of traversed elements of the NoC. The element power state calculation unit estimates the circuit states and the power states of the traversed elements of the NoC according to the transmission timings of the transmission units. The circuit state indicates an operation state of the traversed element. The power state is related to the circuit state. The power estimating unit estimates power consumption of the NoC according to the power states of the traversed elements of the NoC.

The above and other contents of the disclosure will become better understood with regard to the following detailed description of the preferred but non-limiting embodiment (s). The following description is made with reference to the accompanying drawings.

Figure 1:
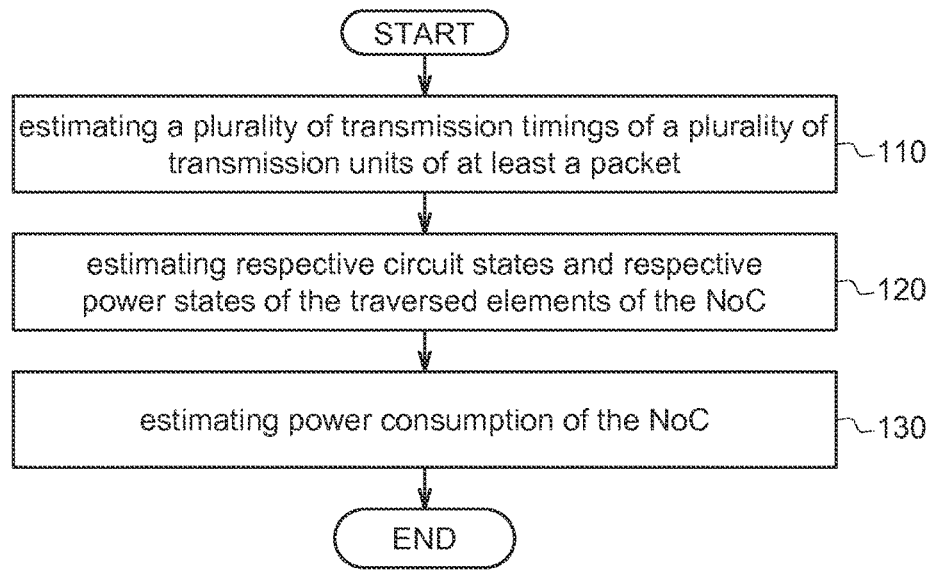
FIG. 1 is a flowchart of a NoC timing power estimation method according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Technical terms of the disclosure are based on general definition in the technical field of the disclosure. If the disclosure describes or explains one or some terms, definition of the terms is based on the description or explanation of the disclosure. Description on the common technology or theories will be omitted if they do not involve the technical features of the disclosure.

Each of the disclosed embodiments has one or more technical features. In possible implementation, one skilled person in the art would selectively implement part or all technical features of any embodiment of the disclosure or selectively combine part or all technical features of the embodiments of the disclosure.

An embodiment of the disclosure discloses a network-on-chip (NoC) timing power estimation device which estimates dynamic power consumption during data transmission in the NoC.

In one or more embodiments and figures, the FIFO buffer is taken for illustration only and, thus, does not limit the present disclosure.

Referring to FIG. 1, a flowchart of a NoC timing power estimation method according to an embodiment of the disclosure is shown. As indicated in FIG. 1, the NOC timing power estimation method disclosed in an embodiment of the disclosure includes following steps. In step 110, during NoC transmission, a plurality of transmission timings of a plurality of transmission unit (the transmission unit may be also referred as a flit (a flow control digit)) of at least an input packet are estimated, wherein the transmission timings includes the time each transmission unit enters a router, the time each transmission unit leaves the router, the time each transmission unit enters a buffer and the time each "flit" leaves the buffer. Details of the step 110 will be elaborated below. An input packet may include a plurality of transmission units. In an embodiment, the step 110 may further correspond to equation solution and the circuit architecture of the NoC.

In step 120, according to the transmission timings of the transmission units obtained in step 110, respective circuit states and respective power states of pleural or all traversed elements of the NoC are estimated. Here, the element such as a router and a buffer through which the packets will pass is referred as a traversed element. The circuit state, which contains a router dynamic circuit state and a buffer dynamic circuit state, indicates the state of the traversed element when the traversed element is read and/or written and/or the queue number in the traversed element at the clock cycle. Details of the step 120 will be elaborated below. The power state of the traversed element may be estimated from the circuit state of the traversed element.

In step 130, according to the power states of pleural or all traversed elements estimated in step 120, power consumption of the NoC in each clock cycle is estimated. In an embodiment, power consumption of the NoC in each clock cycle may be estimated based on a pre-determined NoC power model.

To estimate dynamic power of the NoC in each clock cycle, in an embodiment, the dynamic circuit state of the NoC during packet transmission in each clock cycle is estimated (such as step 120). This is because dynamic circuit state of the NoC element is closely related to packet transmission. Therefore, in an embodiment of the disclosure, the estimation of the NoC dynamic power state (or, dynamic circuit state) may be according to "the transmission timing of the transmission units". That is, the estimation of the NoC dynamic power state (or, the NoC dynamic circuit state) may be obtained by converting the transmission timing of the transmission units. In an embodiment of the disclosure, the transmission timing of the transmission units may be obtained through equation solution. The estimation of NoC dynamic power in the embodiment of the disclosure is faster and more accurate.

Details of estimating the transmission timing of each transmission unit according to an embodiment of the disclosure are disclosed below. In the embodiment of the disclosure, in the NoC transmission process, respective time points at which each transmission unit of each input packet enters/leaves a router and a buffer may be calculated through equation solution.

The calculation method disclosed in the embodiment of the disclosure may support many kinds of NoC circuit architectures. However, if the embodiment of the disclosure is used in different NoC architectures, the timing power estimation method will be different. For example, different timing equations are used.

Figure 2:
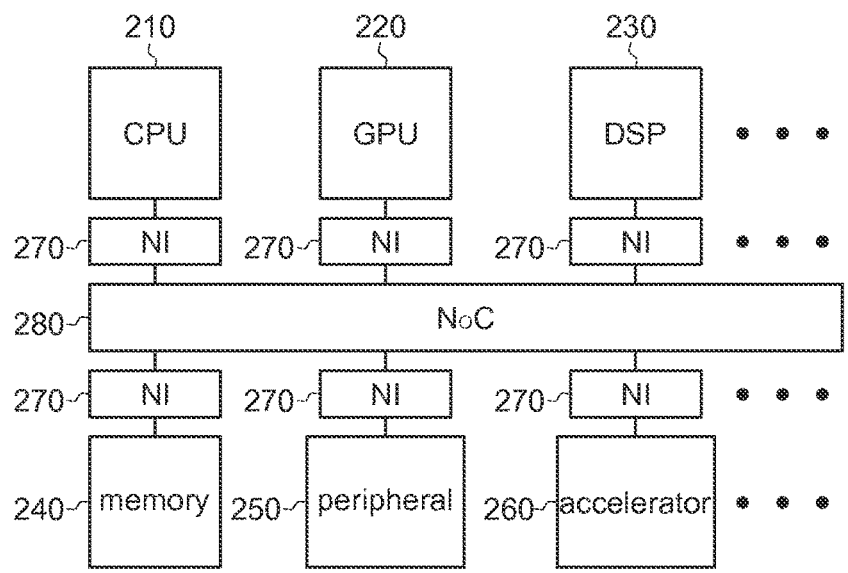
FIG. 2 is a schematic diagram of an ordinary NoC multi-core system.

FIG. 2 is a schematic diagram of an ordinary NoC multi-core system. Intelligent properties (IP) 210-260 are connected to a NoC 280 through a network interface (NI) 270 for data transmission. Here, the intelligent property may be realized by such as a central processing unit (CPU), a graphics processing unit (GPU), a digital signal processor (DSP), a memory, a peripheral or an accelerator.

Figure 3:
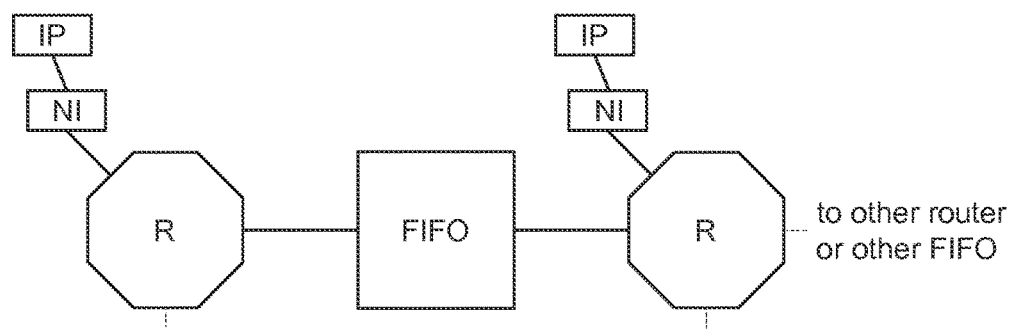
FIG. 3 is a diagram of partial architecture of an ordinary NoC.

FIG. 3 is a diagram of partial architecture of an ordinary NoC. In general, the NoC includes a plurality of routers R coupled to each other through signal lines. Within a clock cycle, a large amount of signal exchange may occur. Moreover, according to system requirements, a buffer (such as a first-in-first-out (FIFO) buffer) may be between the routers to buffer the transmission units of the packet. As indicated in FIG. 3, the router may be connected to the intelligent property (IP) through the interface NI.

Figure 4:
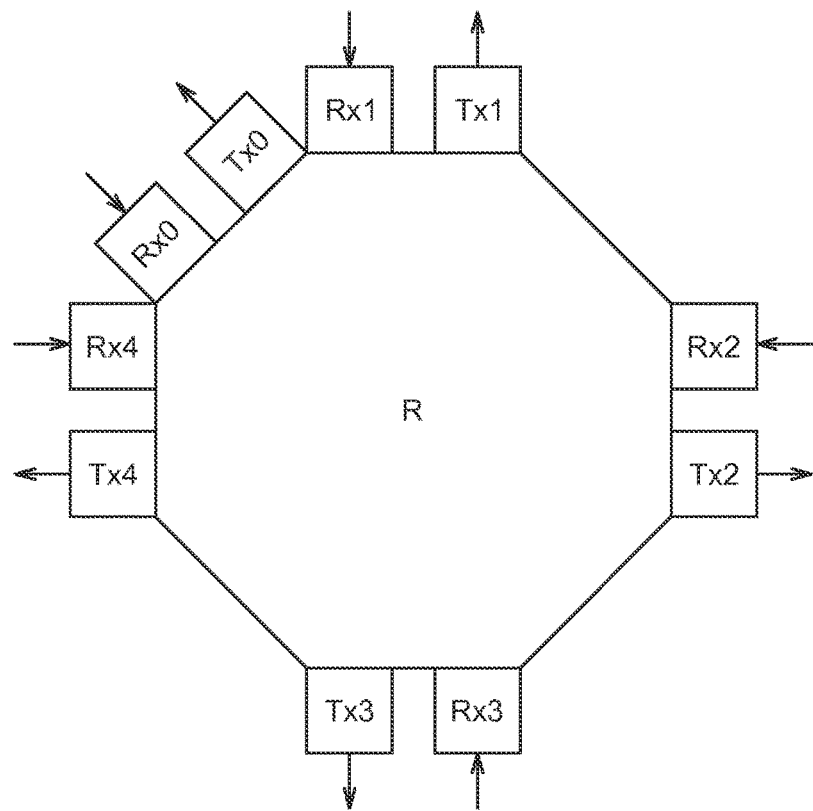
FIG. 4 is a schematic diagram of an ordinary router in 2D mesh topology.

FIG. 4 is a schematic diagram of an ordinary router in 2D mesh topology. In general, the router may have any amount of receive (Rx) ports and transmit (Tx) ports. Although the example of FIG. 4 shows that the router R has five receive ports Rx0-Rx5 and five transmit ports Tx0-Tx5, the disclosure is not limited thereto. As indicated in FIG. 4, the router may be connected to other adjacent routers in four directions, i.e. top, bottom, left and right, (through or not through buffers) and/or connected to the local interface NI and further connected to the intelligent property IP through the interface NI. The receive port and the transmit port are numbered according to the directions of the ports. The Rx0/Tx0 port is local and may be connected to a local interface and further connected to an IP via the interface. The Rx1/Tx1 port may be connected to the router and/or the buffer at the top of the router. The Rx2/Tx2 may be connected to the router and/or the buffer at the right of the router. The Rx3/Tx3 port may be connected to the router and/or the buffer at the bottom of the router. The Rx4/Tx4 port may be connected to the router and/or the buffer at the left of the router.

Besides, in some embodiments of the disclosure, the architecture parameters of routers may be summarized as below. If the architecture parameters are different, the timing power estimation method will be different, accordingly. For example, different equations of packet timing are used. The parameter "Topology" represents the topology in connecting the routers. Common parameter "Topology" is for example, ring, 2D, 3D mesh, 2D torus, 3D torus, tree, octagon, and k-ary n-fly butterfly.

The parameter "Routing algorithm" determines the routing path of the packet from a source router to a target router. Common routing parameter "Routing algorithm" is for example, X-Y, toggle X-Y, Valiant, ROMM, O1Turn, PROM, BSOR, and adaptive routing.

The parameter "switching strategy" represents the strategy of allocating the data storage space of a router. Common routing parameter "switching strategy" is for example, wormhole, virtual cut-through, store and forward.

The parameter "Flow control" represents communication between the routers about whether data transmission is allowed. Common parameter "Flow control" is for example, credit based, On/Off (STALL-GO), and ACK-NACK.

The parameter "arbitration policy" represents a rule for arbitrating which packet has the channel usage right if two packets both want to leave the router though the same transmit port at the same time. Common parameter "arbitration policy" is for example, fixed priority, round-robin, least recently used (LRU), random, and first in first out (FIFO).

The parameter "Router microarchitecture" represents implementation details of the router. Let the pipeline mechanism be taken for example. Common pipeline mechanism of a router is for example, single-cycle router, 2-stage pipelined router, 3-stage pipelined router, and 4-stage pipelined router and so on. The single-cycle router represents the pipeline register(s) of the router is 1-stage.

Figure 5A:
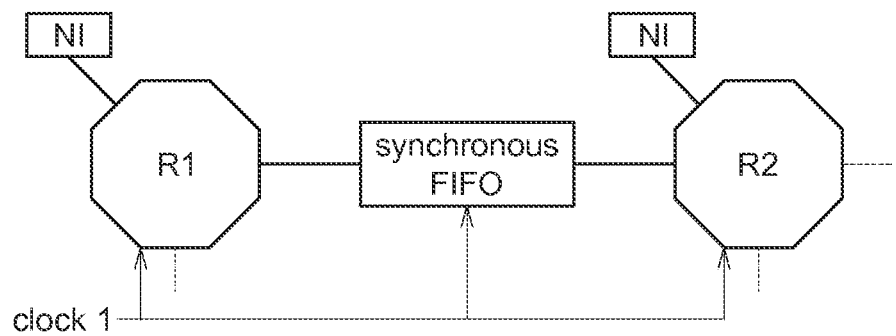
FIG. 5A is a schematic diagram showing arrangement of a synchronous FIFO between adjacent routers to buffer data in an embodiment of the disclosure.

Also, a buffer may be added in the NoC. As indicated in the embodiment in FIG. 5A, a synchronous FIFO may be between the routers R1 and R2 to buffer data. Through such arrangement, the router R1, the synchronous FIFO and the router R2 are in the synchronous clock domain and they are operated under the clock signal clock 1.

Figure 5B:
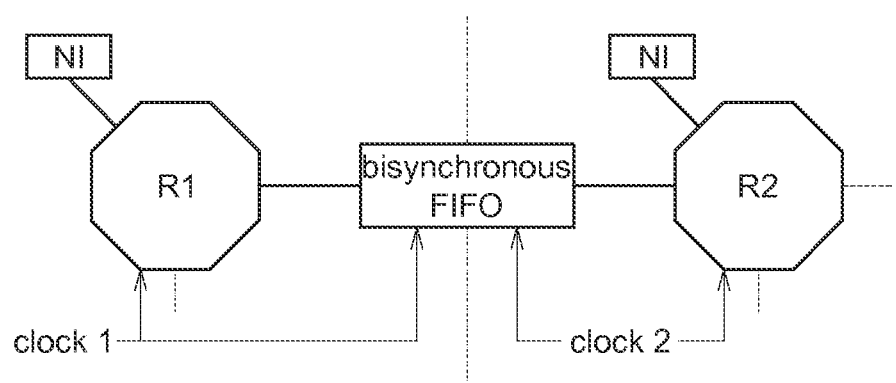
FIG. 5B is a schematic diagram showing arrangement of a bisynchronous FIFO between adjacent routers to buffer data in an embodiment of the disclosure.

Or, in another embodiment of FIG. 5B, a bisynchronous FIFO is between the routers R1 and R2 to buffer data. Through such arrangement, the router R1, the bisynchronous FIFO and the router R2 may be under different asynchronous clock domains. The router R1 and the input side of the bisynchronous FIFO are operated under a clock signal clock 1 (i.e. the router R1 and the input side of the bisynchronous FIFO are in the clock domain), while the output side of the bisynchronous FIFO and the router R2 are operated in a clock signal clock 2 (i.e. the output side of the bisynchronous FIFO and the router R2 are in another clock domain). Thus, the bisynchronous FIFO is used as an intermediate to assure the accuracy of data transmission. Besides, the clock at the input side of the bisynchronous FIFO is referred as clk_push, and the clock at the output side of the bisynchronous FIFO is referred as clk_pop. The buffer architecture affects the behavior and the timing at which data passes through the buffer. If the buffer architecture is different, the embodiment of the disclosure will correspondingly use different packet timing equations.

Figure 6:
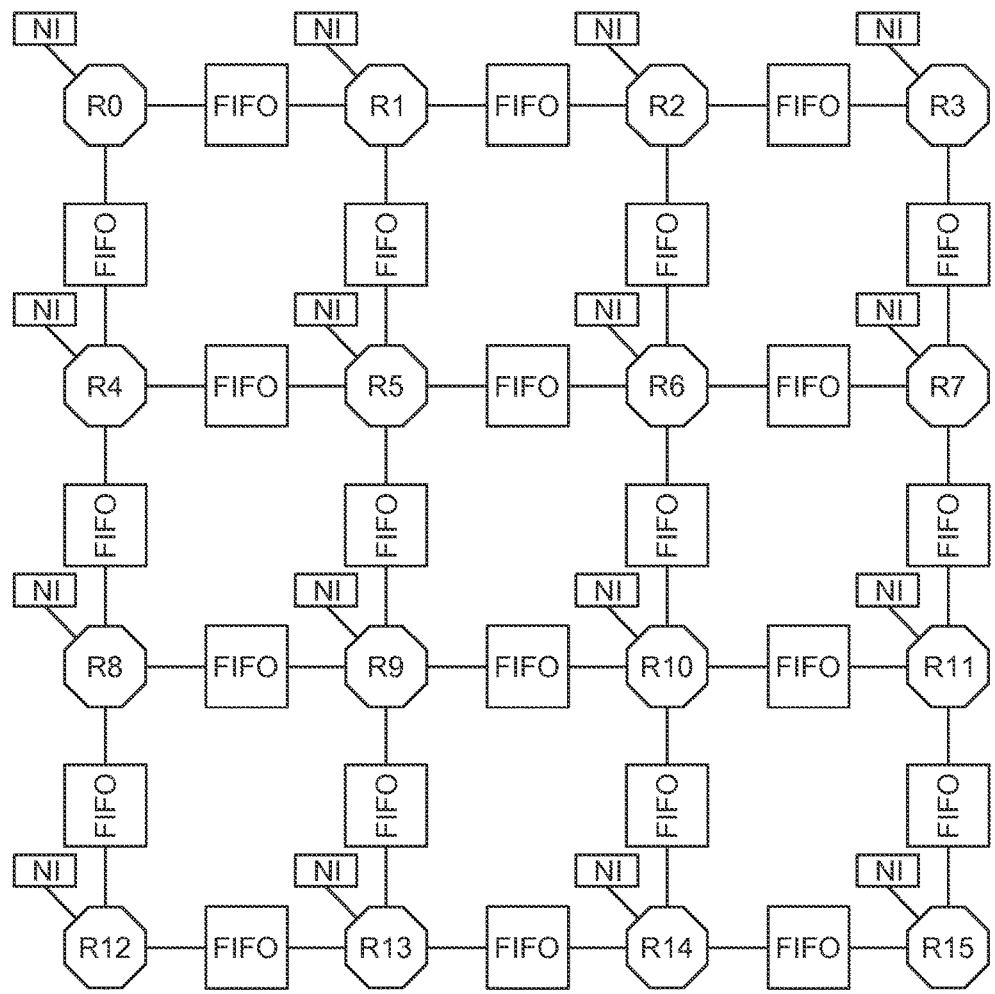
FIG. 6 is a schematic diagram of a NoC architecture adopting a bisynchronous FIFO according to an embodiment of the disclosure.

For convenience of description, the embodiment of the disclosure may be used in such as a 4×4 2D mesh NoC which applies a bisynchronous FIFO. As indicated in FIG. 6, a schematic diagram of a NoC architecture adopting a bisynchronous FIFO of an embodiment of the disclosure is shown. NoC architecture parameters of FIG. 6 include: the parameter "Topology": 4×4 2D mesh (4×4 representing 16 routers R0-R15 arranged in 4 columns and 4 rows); the parameter "Routing algorithm": X-Y routing; the parameter "arbitration policy": fixed priority; the parameter "switching strategy": wormhole; the parameter "Flow control": On/Off; and the parameter "Router microarchitecture": single-cycle router. The bisynchronous FIFO of FIG. 6 has a depth of 2, for example.

Figure 7:
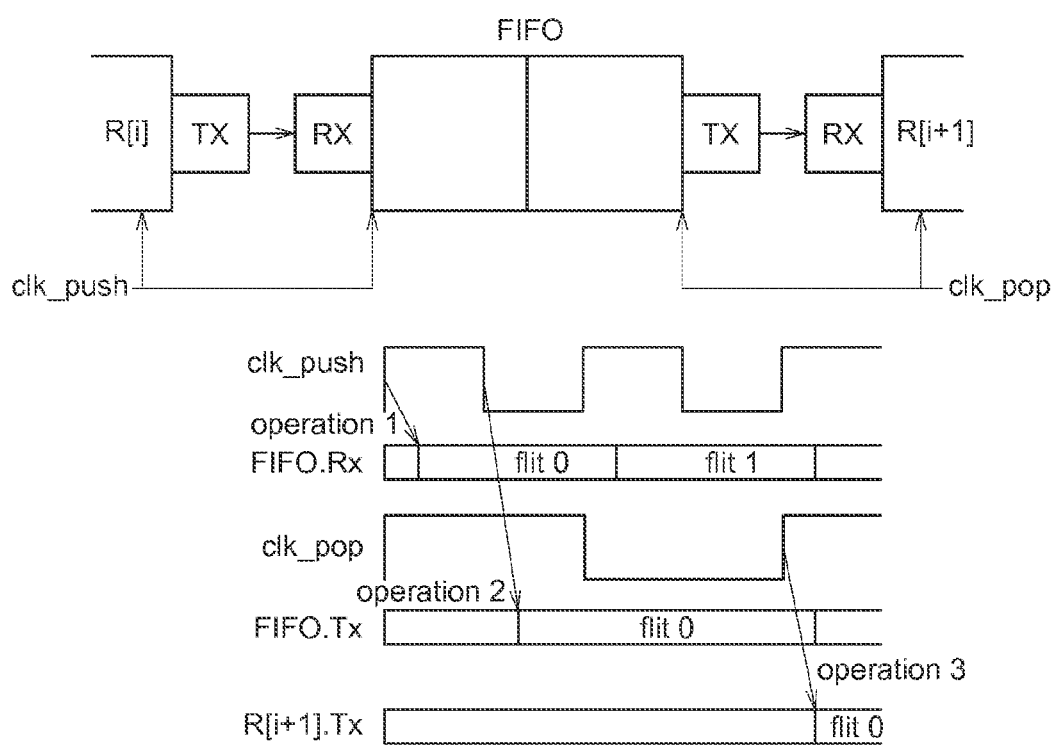
FIG. 7 is a schematic diagram of operation of a bisynchronous FIFO according to an embodiment of the disclosure.

The bisynchronous FIFO may be triggered by the positive edge and the negative edge of the clock signal. Referring to FIG. 7, a schematic diagram of operation of the bisynchronous FIFO of an embodiment of the disclosure is shown. At the positive edge of the clock signal clk_push, a router R[i] prepares data (operation 1). At the negative edge of the clock signal clk_push, the bisynchronous FIFO is ready to receive data (operation 2). At the positive edge of the clock signal clk_pop, the bisynchronous FIFO transmits data to a router R[i+1] (operation 3). Such design increases the efficiency of data transmission, but also affects the parameter of the packet timing equation of the embodiment of the disclosure. "FIFO.Rx" and "FIFO.Tx" respectively represent the input timing and the output timing of the FIFO. "R[i+1].Tx" represents the output timing of the router R[i+1].

In an embodiment of the disclosure, in calculating the transmission timing of the transmission unit, in order to calculate the timing at which the transmission unit passes through the NoC timing, at least 4 packet parameters need to be known. The 4 packet parameters respectively are "Time", "Source", "Destination", and "Size". The parameter "Time" represents the time point at which the packet enters the NoC. The parameter "Source" represents the source router which transmits the packet, that is, each router has an identification (ID), and the parameter "Source" is the identification (ID) of the router through which the passes first after the packet enters the NoC. The parameter "Destination" represents the destination router of the packet, that is, the ID of the last router through which the packet passes before the packet leaves the NoC. The parameter "Size" represents the size of the packet indicated by the number of transmission units. For instance, if a packet has 4 transmission units, the size of the packet is "4", wherein the first transmission unit (flit 0) is referred as the header and the last transmission unit (flit 3) is referred as the tail.

Figure 8:
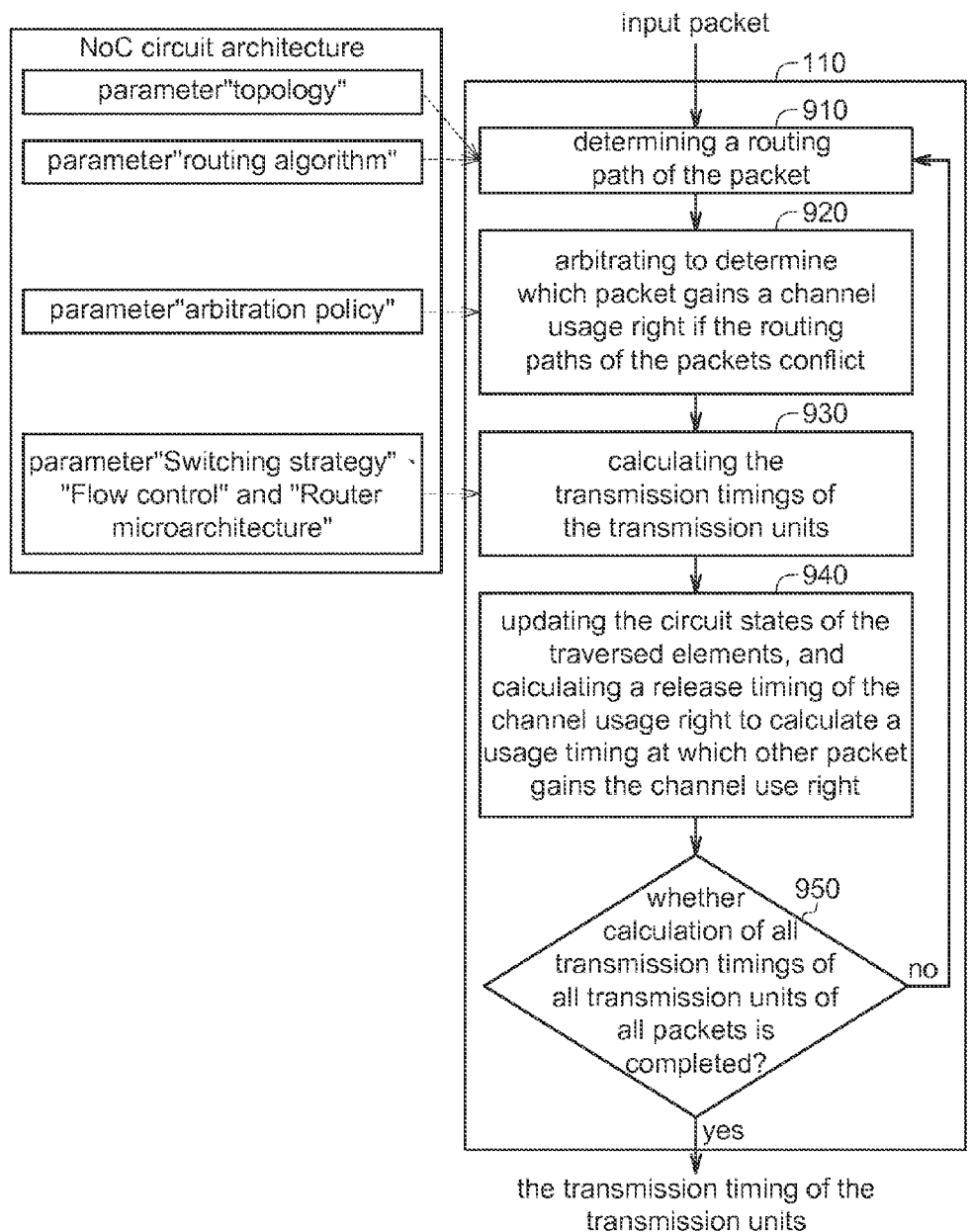
FIGS. 8-9 are schematic diagrams of calculating a transmission timing of a transmission unit according to two embodiments of the disclosure.
Figure 9:
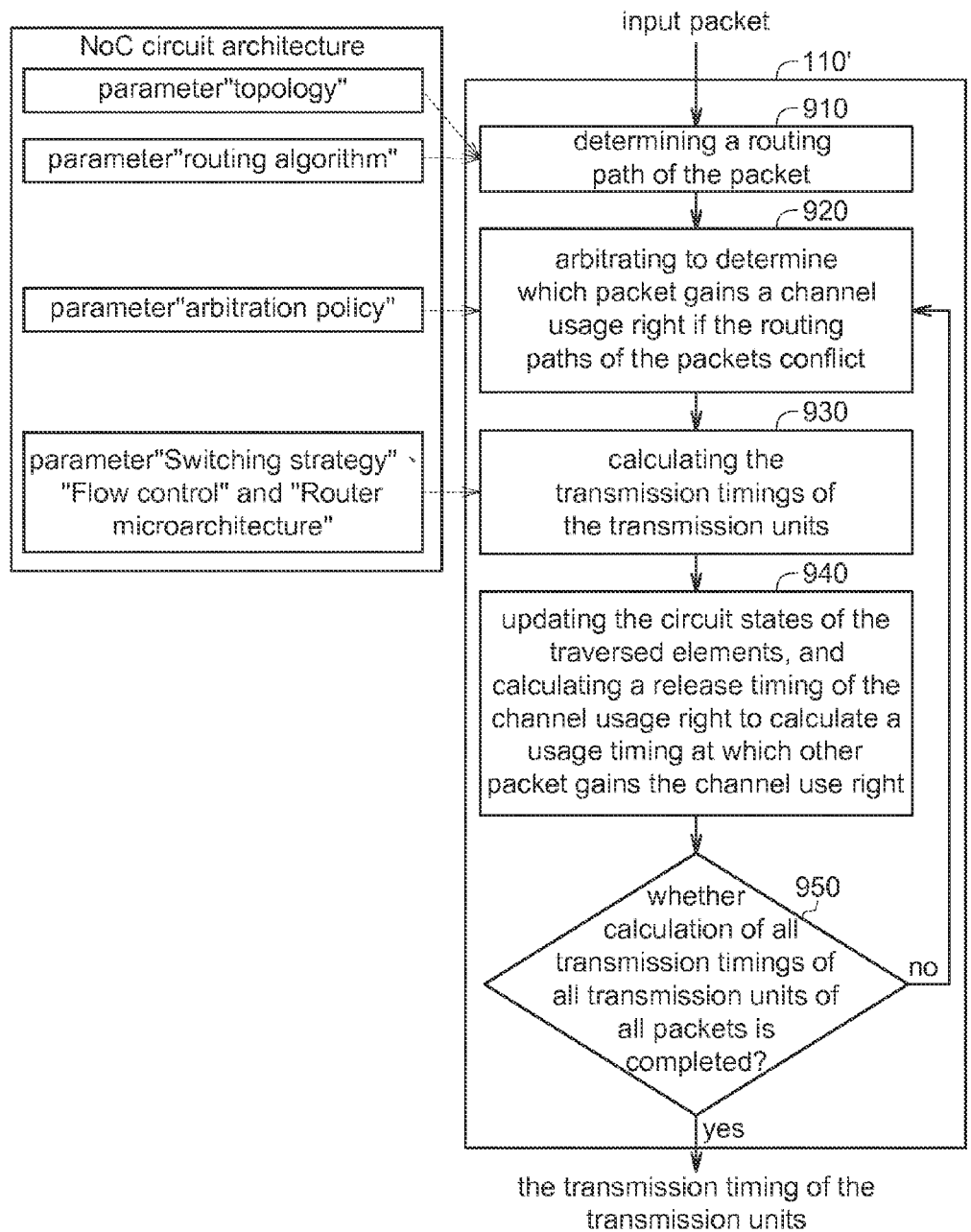

FIG. 8 and FIG. 9 are two schematic diagrams of two examples of calculating the transmission timing of the transmission unit according to the disclosure. FIG. 8 illustrates dynamic routing, and FIG. 9 illustrates static routing. The difference between the dynamic routing and the static routing is that: after the circuit state is updated, the routing path needs to be calculated again in dynamic routing but does not need to be calculated in static routing. Under the static routing, after a packet enters the NoC, the routing path is immediately determined and does not change.

Steps 110 and 110' include 5 steps 910-950 respectively, which are elaborated below.

Figure 10:
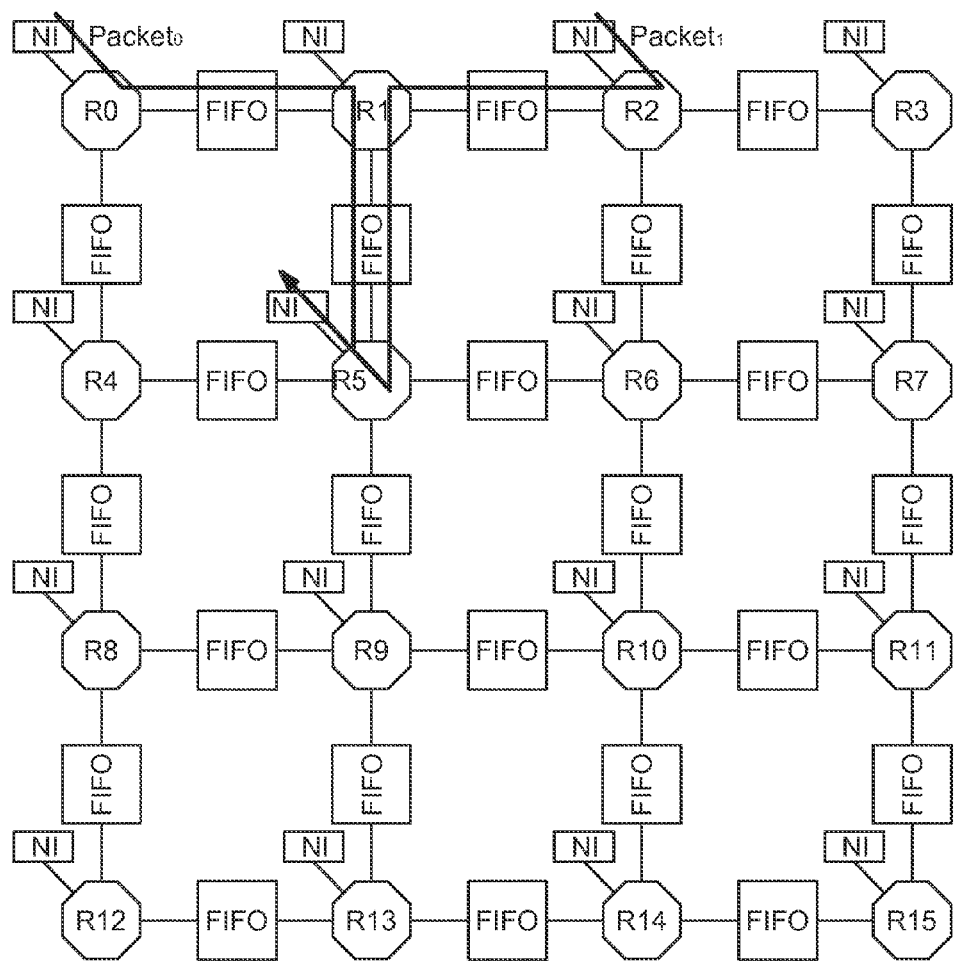
FIG. 10 shows determination of the routing path in an embodiment of the disclosure.

In step 910, the routing path of the packet is determined according to the parameters "source" and "destination" of the input packet and the NoC routing parameter "Routing algorithm". FIG. 10 is an example of determining the routing path in an embodiment of the disclosure in the case that the NoC architecture is in 4×4 2D mesh and the routing algorithm is X-Y routing. The X-Y routing is a simple static routing which goes along the X (horizontal) direction first and then along the Y (vertical) direction to reach the destination.

In the embodiment illustrated in FIG. 10, the source of the packet $Packet_0$ is router R0 and the destination is router R5. Therefore, the packet $Packet_0$ passes through router R0→router R1→router R5. If the Rx/Tx through which the packet passes is further indicated in the routing path, the routing path Path(Packet$_0$) of the packet Packet$_0$ is expressed as:
(R0.Rx0→R0.Tx2→R1.Rx4→R1.Tx3→R5.Rx1→R5.Tx0). For example, "R0.Rx0→R0.Tx2" represents the packet enters via the receive port Rx0 of the router R0 and output via the transmit port Tx2 of the router R0.

Similarly, the routing path Path(Packet$_1$) of the packet Packet$_1$ is expressed as: (R2.Rx0→R2.Tx4→R1.Rx1→R1.Tx3→R5.Rx1→R5.Tx0).

In step 920, if the routing paths of the packets conflict, arbitration is performed to determine which packet gains the channel usage right. For instance, when two packet want to leave a router via the same the transmit port, arbitration is performed to determine which packet gains the channel usage right on the routing path. In the above example, the packet Packet$_0$ enters the router R1 via the receive port Rx4 of the router R1 and the packet Packet$_1$ enters the router R1 via the receive port Rx1 of the router R1. Moreover, if the two packets Packet$_0$ and Packet$_1$ both try to leave the router R1 via the transmit port Tx3 of the router R1, the two packets have path conflict. Thus, the router R1 uses the arbitration policy parameter "arbitration policy" to determine which packet gains the channel usage right. For example, if the arbitration policy is fixed priority, the priority for gaining the channel usage right is fixed as: Rx0>Rx1>Rx2>Rx3>Rx4. That is, the packet entering the router via the receive port Rx0 gains the highest priority, and the packet entering the router via the receive port Rx4 has the lowest priority. In the above example, since the packet Packet$_0$ enters the router R1 via the receive port Rx4 of the router R1 and the packet Packet$_1$ enters the router R1 via the receive port Rx1 of the router R1, the router R1 arbitrates that the packet Packet$_1$ gains the channel usage right.

In step 930, the transmission timing of the transmission units are calculated. As disclosed above, through arbitration, the packet having higher priority gains the channel usage right on the routing path. The transmission timing (the timing at which each transmission unit enters/leaves the buffer and/or the router on the routing path) of each transmission unit of the packet gaining the channel usage right is calculated. Step 930 may be performed with reference to parameters "switching strategy", "Flow control" and "Router microarchitecture".

In the above example, the packet Packet$_1$ gains the channel usage right on the routing path, and therefore the transmission timing of each transmission unit of the packet Packet$_1$ is calculated, and the calculation details are elaborated below.

In step 940, respective circuit states of the traversed elements are updated, and a release timing of the channel usage right is calculated, to calculate a usage timing at which other packet gains the channel usage right. In the above example, after the transmission timing of the tail of the packets Packet$_1$ is calculated, the timing at which the tail of the packets Packet$_1$ leaves the router R1 may be obtained to update the release timing of the transmit port Tx3 of the router R1. The timing at which the packet Packet$_0$ is allowed to enter the router R1 is calculated. Calculation details of the transmission timing of a packet are elaborated below.

In another embodiment, whether update of respective circuit states of the traversed elements affects the routing path of the packet is determined according to whether the routing parameter is a dynamic routing or a static routing. Details are elaborated below.

In step 950, determination regarding whether calculation of all transmission timings of all transmission units of all packets is completed is made. If yes in step 950, step 110/110' terminates. A comparison between the embodiment of FIG. 8 and the embodiment of FIG. 9 shows that in the dynamic routing (FIG. 8), if calculation of the transmission timings of all transmission units of all packets has not yet been completed (the determination in step 950 is "No"), the method returns to step 910, and steps 910-950 are repeated again (that is, update of circuit states affects the routing path of the packet). In the static routing (FIG. 9), even when all circuit states are updated, the update does not affect the routing path of all packets; and if calculation of the transmission timings of all transmission units of all packets has not been completed (the determination in step 950 is "No"), the method returns to step 920 to repeat steps 920-950. That is, once the routing path of packet is determined, the routing path will not be affected by update of the circuit states in dynamic routing.

Figure 11:
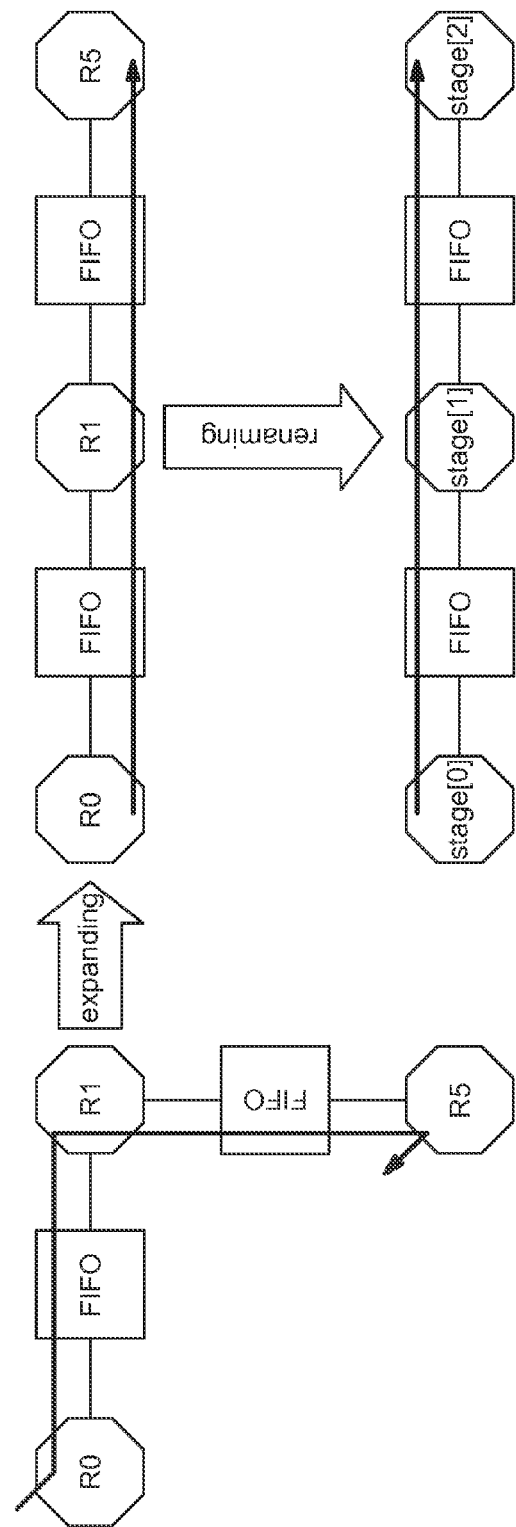
FIG. 11 is a schematic diagram of determining/defining a router stage[i] on a routing path according to an embodiment of the disclosure.

Calculation details of the transmission timing of each transmission unit of the packet are elaborated below. The routing path is determined/defined. The routing path determined in the routing step (step 910 of FIG. 9) is referred as a parameter Path( ). For convenience of description, in an embodiment of the disclosure, the routers on the routing path Path( ) are expanded and renamed as stage[0], stage[1] . . . . The term "stage[i]" ("i" is a positive integer) indicates the i-th router on the routing path Path( ). FIG. 11 is a schematic diagram of determining/defining the router stage[i] on the routing path Path( ) according to the embodiment of the disclosure.

As indicated in FIG. 11, suppose the packet passes through the routers in the sequence of: R0→R1→R5, then the routing path Path( ) of the packet includes routers R0, R1 and R5. After the routers on the routing path are virtually expanded according to the sequence, the routers are renamed as routers stage[0], stage[1] and stage[2], wherein, routers stage[0], stage[1] and stage[2] respectively are routers R0, R1 and R5.

Figure 12:
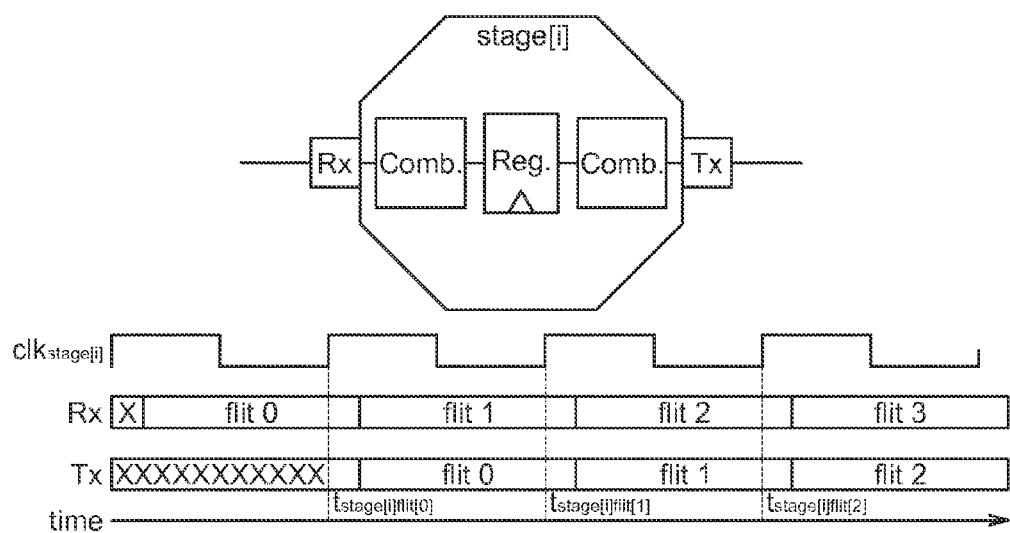
FIG. 12 is a schematic diagram in which the j-th transmission unit flit[j] of a packet enters a router stage[i] at time $t_{stage[i]flit[j]}$ (j is a positive integer) according to an embodiment of the disclosure.

In an embodiment of the disclosure, a parameter $t_{stage[i]flit[j]}$ is determined/defined, wherein the parameter $t_{stage[i]flit[j]}$ represents the timing at which the j-th transmission unit flit[j] ("j" is a positive integer) of the packet enters the router stage[i], that is, the time point at which the last stage register of the router stage[i] samples the j-th transmission unit flit[j] of the packet. Let a single-cycle router including single-stage register be taken for example. Suppose the register is triggered by the positive edge, the parameter $t_{stage[i]flit[j]}$ is as indicated in FIG. 12. FIG. 12 shows the parameter $t_{stage[i]flit[j]}$ at which the j-th transmission unit flit[j] of the packet enters the router stage[i].

A delay between the register and the transmit port Tx is caused by a combinational circuit (comb). In the embodiment of the disclosure, the cycle-accuracy requirements may be satisfied according to the register sampling time.

In an embodiment of the disclosure, a parameter $t_{stage[i]release}$ is determined/defined, wherein the parameter $t_{stage[i]release}$ represents the time point at which the router stage[i] is released by the tail of the packet (that is, the time point at which the tail of the packet enters the next router/buffer). Let the packets Packet$_0$ and Packet$_1$ of FIG. 10 be taken for example. The router R1 arbitrates that the packet Packet$_1$ gains the channel usage right on the transmit port Tx3 (R1.Tx3) of the router R1. In respect of the packet Packet$_0$, the parameter $t_{stage[1]release}$ is the parameter $t_{stage[2]tail}$ of the packet Packet$_1$ ($=t_{stage[2]flit[3]}$). That is, the release timing of the router R1 is the parameter $t_{stage[2]tail}$ ($=t_{stage[2]flit[3]}$) at which the tail of the packet Packet$_1$ enters the next router (R5, stage[2]).

In the embodiment of the disclosure, the stages on the routing path Path( ) of each packet have their own stage ID. In respect of the routing path Path(Packet$_0$) of the packet Packet$_0$, stage[0], stage[1] and stage[2] respectively are routers R0, R1 and R5. In respect of the routing path Path(Packet$_1$) of the packet Packet$_1$, stage[0], stage[1] and stage[2] respectively are routers R2, R1 and R5.

In an embodiment of the disclosure, a parameter $\Delta t_{passBUFFER}$ is determined/defined, wherein the parameter $\Delta t_{passBUFFER}$ represents the minimum time required for a transmission unit to pass through a buffer if congestion does not occur (the parameter $\Delta t_{passBUFFER}$ also referred as buffer passing time). The parameter $\Delta t_{passBUFFER}$ varies with the buffer architecture. Also, since each transmission unit basically has the same number of bits, the minimum time required for each transmission unit to pass through the buffer basically is the same.

Furthermore, the parameter $\Delta t_{passBUFFER}$ is defined as follows. If congestion does not occur, the time point at which the transmission unit is sampled by the previous stage router (before the buffer) is as T1 (meanwhile, the transmission units has not been received by buffer), the time point at which the transmission units is sampled by the next stage router (after the buffer) is as T2, and $\Delta t_{passBUFFER}$=T2-T1.

In an embodiment of the disclosure, the parameter $\Delta t_{passBUFFER}$ is related to "the buffer architecture", "the clock cycle at the input side and output side of the buffer" and "the time point at which the transmission unit is sampled by the previous stage router before buffer". The sampling time is relative to the clock signal (clk_push) of the output side of buffer. Details are elaborated below.

Figure 13:
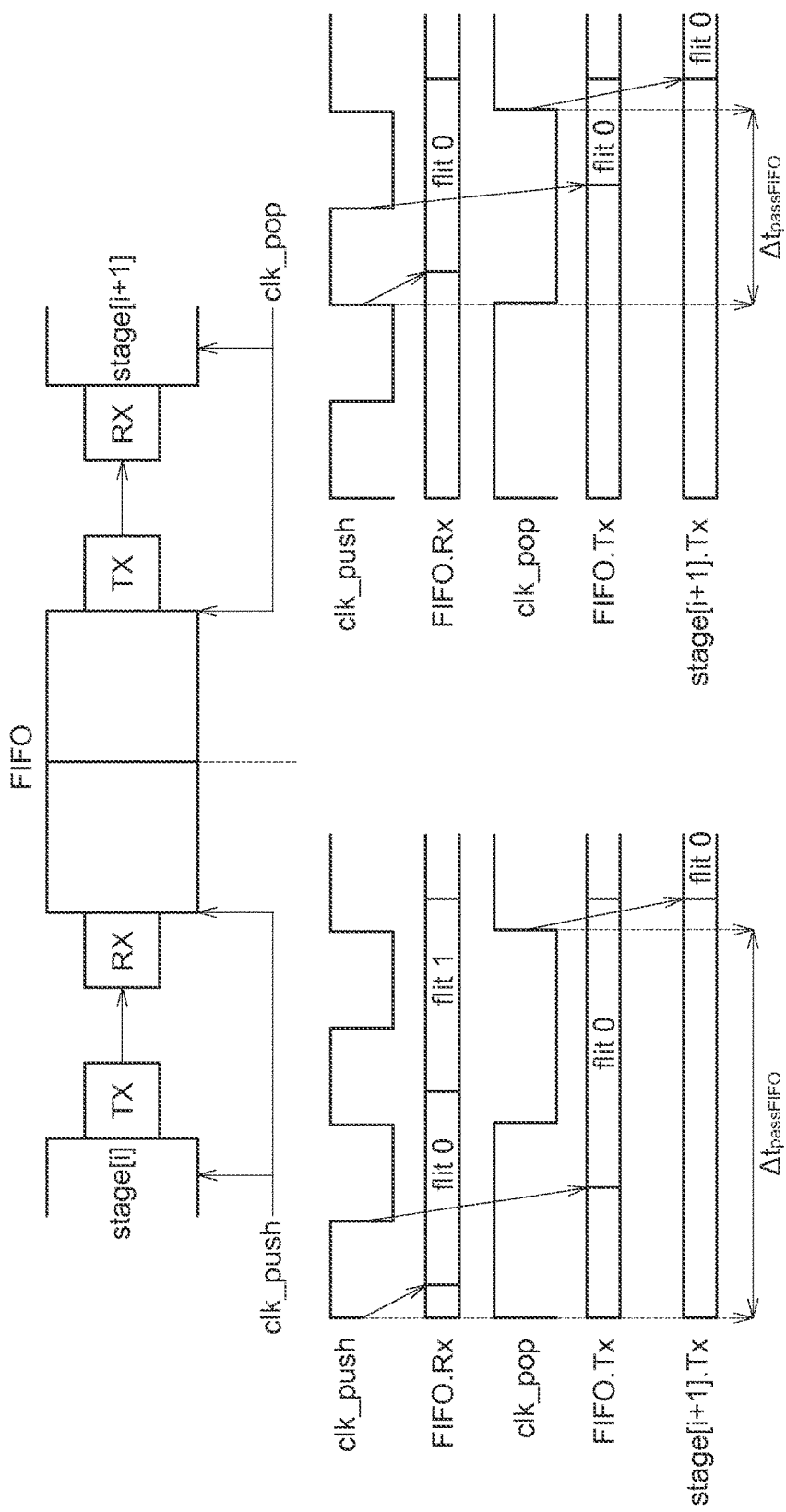
FIG. 13 is a schematic diagram of calculating "buffer passing time" according to two embodiments of the disclosure.

FIG. 13 is a schematic diagram of calculating the parameter $\Delta t_{passBUFFER}$ in two embodiments of the disclosure. Suppose the frequency of the clock signal clk_push is two times of the clock signal clk_pop. FIG. 13 respectively shows two situations in which the transmission unit is sampled by the previous stage router before the bisynchronous FIFO at different phases. In the embodiment illustrated in the left-hand side of FIG. 13, the transmission unit "flit 0" is sampled by the previous stage router before the bisynchronous FIFO at the positive edge of the clk_push, and the transmission unit passes through the bisynchronous FIFO in 2 cycles of the clock signal clk_push. In the embodiment illustrated in the right-hand side of FIG. 13, the transmission unit "flit 0" is sampled by the previous stage router before the bisynchronous FIFO at the negative edge of the clk_push, and the transmission unit passes through the bisynchronous FIFO in 1 cycle of the clock signal clk_push.

In an embodiment of the disclosure, a parameter $\Delta t_{syncBUFFER}$ is determined/defined, wherein the parameter $\Delta t_{syncBUFFER}$ represents a minimum time between the time point at which the transmission unit is read from a full buffer and the time point at which a next transmission unit is written to the buffer (the parameter $\Delta t_{syncBUFFER}$ also referred as buffer allowed write time). When buffer is full, the transmission unit sampled by the previous stage router is not allowed to enter the full buffer.

Figure 14:
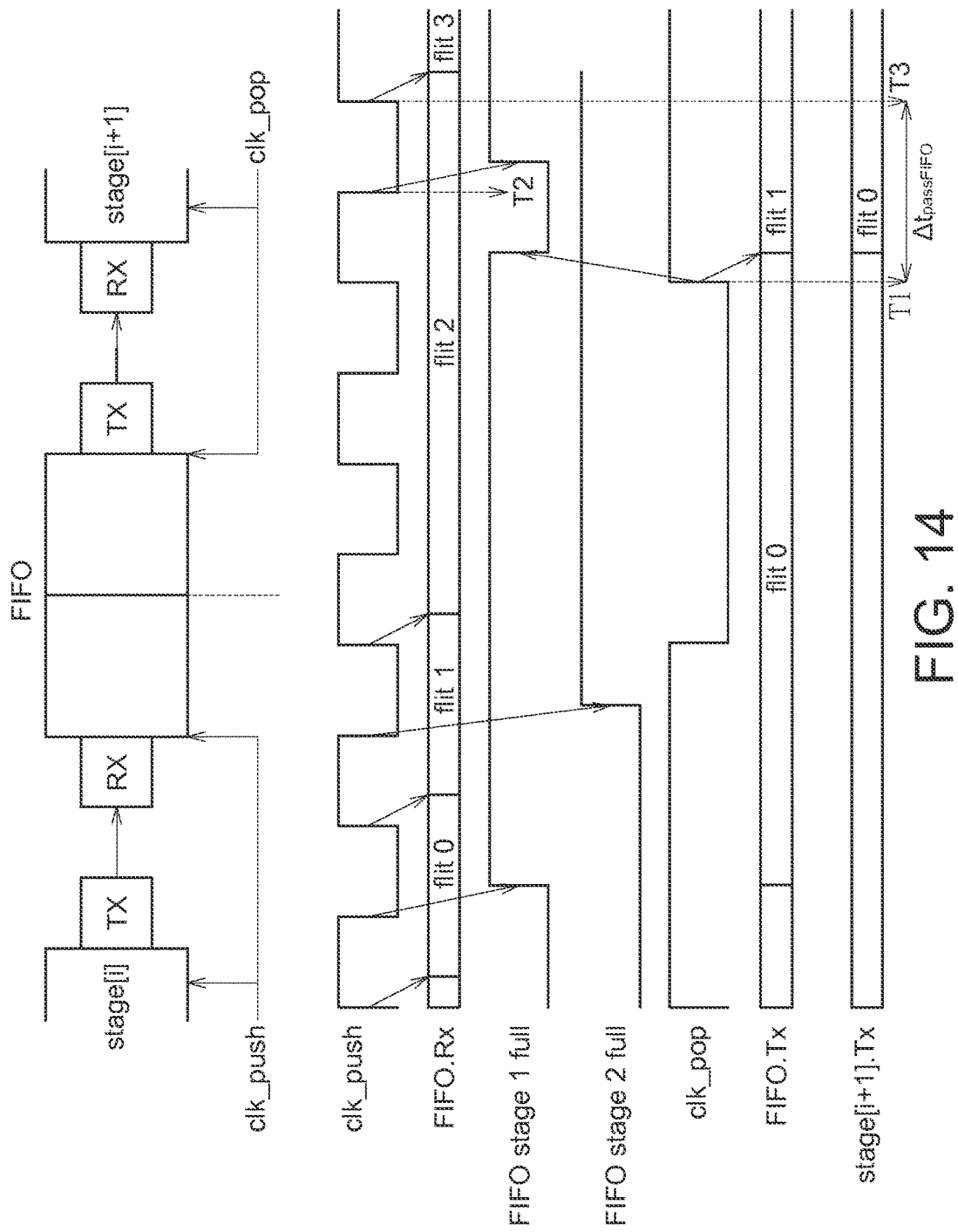
FIG. 14 is a schematic diagram of determining a buffer allowed write time according to an embodiment the disclosure.

FIG. 14 shows the minimum time $\Delta t_{syncBUFFER}$ between the time point at which the transmission unit is read from a full bisynchronous FIFO and the time point at which the next transmission unit is written to the bisynchronous FIFO. Since transmission units "flit 0" and "flit 1" have been written to the bisynchronous FIFO, the bisynchronous FIFO is full. At time point T1, the next router stage[i+1] samples/reads the transmission unit "flit 0" at the positive edge of the clock signal clk_pop. At time point T2, bisynchronous FIFO samples the transmission unit "flit 2" transmitted from the previous router stage[i] at the negative edge of the clock signal clk_push. At time point T3, the previous router stage[i] samples the next transmission unit "flit 3" at the positive edge of the clock signal clk_push. $\Delta t_{syncBUFFER}$=T3-T1. Signals "FIFO stage 1 full" and "FIFO stage 2 full" respectively represent whether the first stage and the second stage of the bisynchronous FIFO are written.

Details of calculating the transmission timing of the transmission unit of the packet according to an embodiment of the disclosure are described below. The calculating algorithm is as below and the calculation of the for the parameter $t_{stage[i]flit[j]}$ applies the equation (1) and equation (2).

Calculating Algorithm:

| Calculation flow of a packet |
| --- |
| Require: Packet is divided into n+1 flits;<br>Transmission path has m+1 stages;<br>for (do j = 0→n)<br>    for (do i = 0→m)<br>        Calculating $t_{stage[i]flit[j]}$;<br>    end for<br>end for |

Equation (1) is used for calculating the time $t_{stage[i]flit[0]}$ at which the header (flit[0]) of the packet enters the router stage[i] (the time $t_{stage[i]flit[0]}$ also referred as the header entering time which represents the time at which the header enters the router). Equation (1) has equations (1.1) and (1.2). In the disclosure, "flit[i]" and "flit i" have the same meaning.

Equation (1):

| Header arrival time of stage[i] |
| --- |
| if $(t_{stage[i-1]flit[0]} + \Delta t_{passFIFO} \leq t_{stage[i]release})$<br>    $t_{stage[i]flit[0]} = t_{stage[i]release} + clk_{stage[i]}$ (1.1)<br>else<br>    $t_{stage[i]flit[0]} = t_{stage[i-1]flit[0]} + \Delta t_{passFIFO}$ (1.2) |

During the calculation process, whether congestion is occurred needs to be taken into consideration.

The condition for the occurrence of congestion is: $(t_{stage[i-1]flit[0]}+\Delta t_{passFIFO} \leq t_{stage[i]release})$. A sum of the parameter $t_{stage[i-1]flit[0]}$ (which indicates the time point at which the transmission unit flit[0] enters the router stage[i−1]) and the parameter $\Delta t_{passFIFO}$ (which indicates the time point at which the transmission unit flit[0] passes through the buffer between the router stage[i−1] and the router stage[i]) is obtained. The sum represents the time the transmission unit flit[0] should have arrived at the router stage[i]. If the sum is less than the time ($t_{stage[i]release}$) at which the router stage[i] is released by the tail of the previous packet, the current packet is blocked at the router stage[i] by the previous packet and is not allowed to enter the stage[i]. Therefore, congestion occurs. That is, congestion occurs if the router stage[i] is not released at the time when the transmission unit flit[0] should have arrived the router stage[i].

Equation (1.1): since congestion occurs, the time point at which the transmission unit flit[0] enters the router stage[i] is the next clock cycle after $t_{stage[i]release}$. That is, if congestion occurs, the equation (1.1) is used to calculate the time $t_{stage[i]flit[0]}$ at which the header (flit[0]) of the packet arrives the router stage[i].

Equation (1.2): if no congestion occurs, the time point at which the transmission unit flit[0] enters the router stage[i]

is equivalent to a sum of the time point ($t_{stage[i-1]flit[0]}$) at which the transmission unit flit[0] enters the previous router stage[i−1] and the time ($\Delta t_{passFIFO}$) required for the transmission unit to pass through the buffer. That is, if no congestion occurs, the equation (1.2) is used to calculate the time $t_{stage[i]flit[0]}$ at which the header (flit[0]) of the packet arrives at the router stage[i].

In an embodiment of the disclosure, an equation (2) is used to calculate the time ($t_{stage[i]flit[j]}$) at which the subsequent transmission unit flit[j] (j=1, 2, . . . ) of the packet enters the router stage[i] (the time $t_{stage[i]flit[j]}$ is also referred as the j-th transmission unit entering time). The equation (2) includes equations (2.1), (2.2) and (2.3).

Equation (2):

| flit[j] arrival time of stage[i] |
|---|
| $t_{stage[i]flit[j]} = t_{stage[i]flit[j-1]} + k \times clk_{stage[i]}$, where k = 1, 2,... (2.1) |
| $t_{stage[i]flit[j]} \geq t_{stage[i-1]flit[j]} + \Delta t_{passFIFO}$ (2.2) |
| $t_{stage[i]flit[j]} \geq t_{stage[i+1]flit[j-d-1]} + \Delta t_{synFIFO}$ (2.3) |

As disclosed above, the parameter "d" represents the depth of the buffer between the routers stage[i] and stage[i+1].

In calculation, the minimum positive integer k satisfying equations (2.2) and (2.3) is applied to equation (2.1) to obtain the parameter $t_{stage[i]flit[j]}$. That is, the parameter $t_{stage[i]flit[j]}$ (in the case that k=1) is obtained (equation 2.1) and applied to the equations (2.2)-(2.3). Whether the parameter $t_{stage[i]flit[j]}$ (k=1) satisfies the equations (2.2)-(2.3) is determined. If so, it is determined that $t_{stage[i]flit[j]}$ (k=1) is the desired $t_{stage[i]flit[j]}$. Otherwise, let k=2, and the above calculation is repeated until the minimum k satisfying all conditions is obtained.

Physical meaning of the equations is elaborated below.

The physical meaning of equation (2.1) is: the time $t_{stage[i]flit[j]}$ at which the transmission unit flit[j] enters the router stage[i] is equivalent to a sum of the time $t_{stage[i]flit[j-1]}$ at which the previous transmission units (flit[j−1]) enters the router stage[i] plus k clock cycles $clk_{stage[i]}$. That is, if the previous transmission unit (flit[j−1]) enters the router stage [i], the transmission unit flit[j] is allowed to enter the router stage[i] after k clock cycles, wherein k is the parameter to be solved.

The physical meaning of equation (2.2) is: the time $t_{stage[i]flit[j]}$ at which the transmission unit flit[j] enters the router stage[i] is greater than (≥) a sum of the time $t_{stage[i-1]flit[j]}$ at which the transmission unit flit[j] enters the previous router stage[i−1] plus the time ($\Delta t_{passFIFO}$) required for the transmission unit flit[j] to pass through the buffer (between the previous router stage[i−1] and the router stage[i]). That is, after the transmission unit flit[j] has been transmitted to the buffer from the previous router stage[i−1] and passed through the buffer, the transmission unit flit[j] is allowed to enter the router stage[i].

The physical meaning of equation (2.3) is: if the buffer (whose depth is d) between the router stage[i] and the router stage[i+1] is full (that is, the transmission units flit[j−2], . . . , flit[j−d−1] are queued in the buffer), the transmission unit flit[j−1] will be blocked at the router stage[i]. Therefore, the time $t_{stage[i]flit[j]}$ at which the transmission unit flit[j] enters the router stage[i] is greater than (≥) a sum of the time $t_{stage[i+1]flit[j-d-1]}$ at which the transmission unit flit[j−d−1] enters the router stage[i+1] plus the time ($\Delta t_{synFIFO}$) for the transmission unit flit[j−1] to be allowed to be written to the buffer. That is, when the buffer is full, after the output side of the buffer has transmitted the transmission unit flit[j−d−1] to the next router stage[i+1] (meanwhile, the buffer releases a storage space for receiving the transmission unit flit[j−1]) and the previous transmission unit flit[j−1] has been written to the buffer, the transmission unit flit[j] is allowed to enter the router stage[i].

Figure 15A:
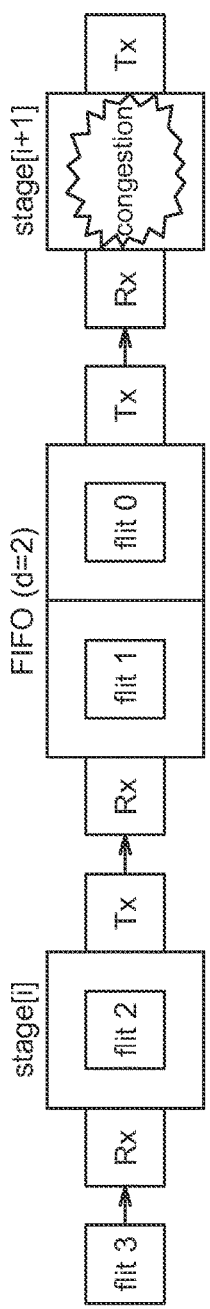
FIGS. 15A-15C are schematic diagrams of calculating the time $t_{stage[i]flit[j]}$ at which the transmission unit flit[j] enters the router stage[i] in a single-cycle router architecture when buffer is full according to an embodiment the disclosure.
Figure 15B:
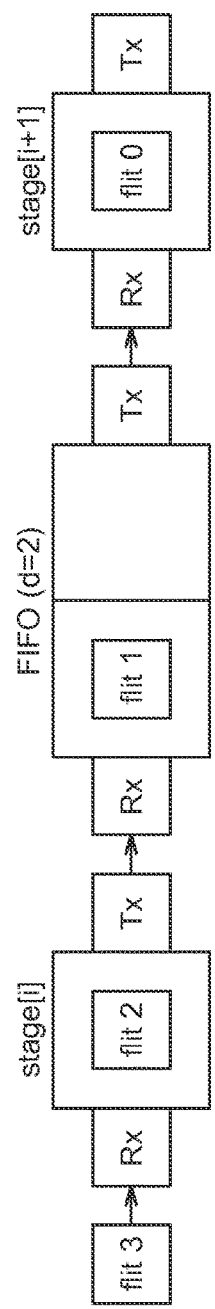
Figure 15C:
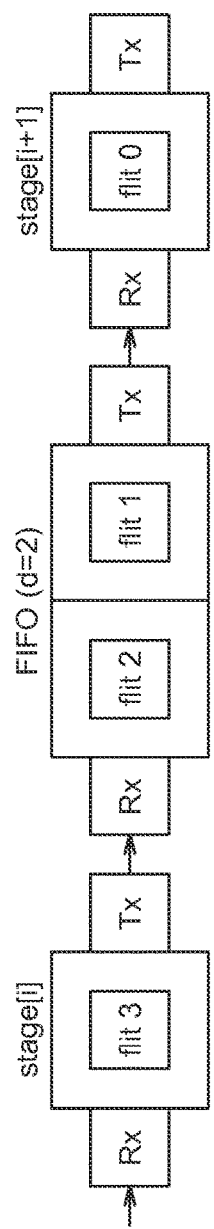

FIGS. 15A-15C are schematic diagrams of calculating the time $t_{stage[i]flit[j]}$ when the buffer is full according to an embodiment of the disclosure (in a single-cycle router architecture, that is, the pipeline register in the router is single-stage). The initial state of FIG. 15A shows that the buffer is full and the input side of the router stage[i+1] has also been occupied, hence congestion occurs. As indicated in FIG. 15B, after the router stage[i+1] has been released and the transmission unit "flit 0" has been written to the router stage[i+1] from the buffer, the buffer releases a storage space. As indicated in FIG. 15C, the transmission unit "flit 3" is allowed to be written to the router stage[i].

Details of obtaining the NoC circuit state according to the transmission timing of the transmission unit in an embodiment of the disclosure are elaborated below. In an embodiment of the disclosure, a power state may be regarded as sub-sets of a circuit state. Since there are many kinds of circuit states, in an embodiment of the disclosure, the circuit states having the same or almost the same power consumption are regarded as the same power state. Therefore, in an embodiment of the disclosure, the power state is determined according to a group of circuit characteristics which are related to the transmission timings of the transmission units. Details of obtaining the power states/circuit characteristics from the transmission timing of the transmission unit in an embodiment of the disclosure are elaborated below.

Implementation 1 of the power state: the power state of the buffer is determined according to whether the buffer is written and whether the buffer is read (the circuit state of the buffer).

Within a clock cycle, 0 or 1 transmission unit may be written to the buffer, and/or 0 or 1 transmission unit may be read from the buffer (read/write operations are independent). As indicated in Table 1, the power state of the buffer is determined according to whether the buffer is written and whether the buffer is read (the circuit state of the buffer).

TABLE 1

| (F: FALSE; T: TRUE) | | |
|---|---|---|
| Is buffer written | Is buffer read | Power state of buffer |
| F | F | S0_BUFFER_1 |
| F | T | S1_BUFFER_1 |
| T | F | S2_BUFFER_1 |
| T | T | S3_BUFFER_1 |

As indicated in Table 1, if whether the buffer is read and whether the buffer is written are used as the circuit characteristics/circuit state, in an embodiment of the disclosure, 4 power states of buffer S0_BUFFER_1-S1_BUFFER_1 are obtained.

Implementation 2 of the power state: the power state of the buffer is determined according to whether the buffer is written, whether the buffer is read and the queue number in the buffer (the circuit state of the buffer).

Within a clock cycle, for the buffer whose depth is d, 0 or 1 transmission unit may be written to the buffer, and/or 0 or 1 transmission unit may be read from the buffer, and/or the number of transmission units queued in the buffer may be {0, 1, 2, . . . , d} (read/write/queue operations are independent). As indicated in Table 2, the power state of the buffer is determined according to whether the buffer is written, whether the buffer is read and the queue number in the buffer (the circuit state of buffer). For convenience of elaboration, d=2 is taken for example here below, but the disclosure is not limited thereto.

TABLE 2

(d = 2)

| Is buffer written | Is buffer read | Queue number in the buffer | Power state of buffer |
|---|---|---|---|
| F | F | 0 | S0_BUFFER_2 |
| F | F | 1 | S1_BUFFER_2 |
| F | F | 2 | S2_BUFFER_2 |
| F | T | 0 | S3_BUFFER_2 |
| F | T | 1 | S4_BUFFER_2 |
| F | T | 2 | S5_BUFFER_2 |
| T | F | 0 | S6_BUFFER_2 |
| T | F | 1 | S7_BUFFER_2 |
| T | F | 2 | S8_BUFFER_2 |
| T | T | 0 | S9_BUFFER_2 |
| T | T | 1 | S10_BUFFER_2 |
| T | T | 2 | S11_BUFFER_2 |

As indicated in Table 2, in the example that the buffer has a depth of 2, 12 power states S0_BUFFER_2-S11_BUFFER_2 are obtained if whether the buffer is read, whether the buffer is written and the queue number in the buffer are used as the circuit characteristics.

Implementation 3 of the power state: the power state of the router is determined according to the write number and the read number of the router (the circuit state of router).

Within a clock cycle, as for an N-in-N-out router (that is, a router having N receive ports and N transmit ports) 0-N transmission units may be written to the router and/or 0-N transmission units may be read from the router (the read/write operations are independent). As indicated in Table 3, a 5-in-5-out router is taken for example, and 36 power states are obtained if the write number and the read number are used as the circuit characteristics.

TABLE 3

| Write number | Read number | Router power state |
|---|---|---|
| 0 | 0 | S0_R_1 |
| 0 | 1 | S1_R_1 |
| 0 | 2 | S2_R_1 |
| 0 | 3 | S3_R_1 |
| 0 | 4 | S4_R_1 |
| 0 | 5 | S5_R_1 |
| 1 | 0 | S6_R_1 |
| 1 | 1 | S7_R_1 |
| ... | ... | ... |
| 5 | 5 | S35_R_1 |

Implementation 4 of the power state: the power state of the router is determined according to whether the receive port of the router is written and whether the transmit port of the router is read (the circuit state of the router).

Within a clock cycle, as for an N-in-N-out router, each receive port of the N-in-N-out router may be written and/or each transmit port of the N-in-N-out router may be read (read/write operations are independent). As indicated in Table 4, let a 5-in-5-out router be taken for example, 1024 ($2^{5+5}$) power states are obtained according to whether each receive port is written and whether each transmit port is read.

TABLE 4

| Rx0 | Rx1 | ... | Rx4 | Tx0 | Tx1 | ... | Tx4 | Power state of router |
|---|---|---|---|---|---|---|---|---|
| F | F | ... | F | F | F | ... | F | S0_R_2 |
| F | F | ... | F | F | F | ... | T | S1_R_2 |
| F | F | ... | F | F | F | ... | 0 | S2_R_2 |
| F | F | ... | F | F | F | ... | T | S3_R_2 |
| F | F | ... | F | F | F | ... | 0 | S4_R_2 |
| F | F | ... | F | F | F | ... | T | S5_R_2 |
| F | F | ... | F | F | F | ... | 0 | S6_R_2 |
| F | F | ... | F | F | F | ... | T | S7_R_2 |
| ... | ... | ... | ... | ... | ... | ... | ... | ... |
| T | T | T | T | T | T | T | T | S1023_R_2 |

Figure 16:
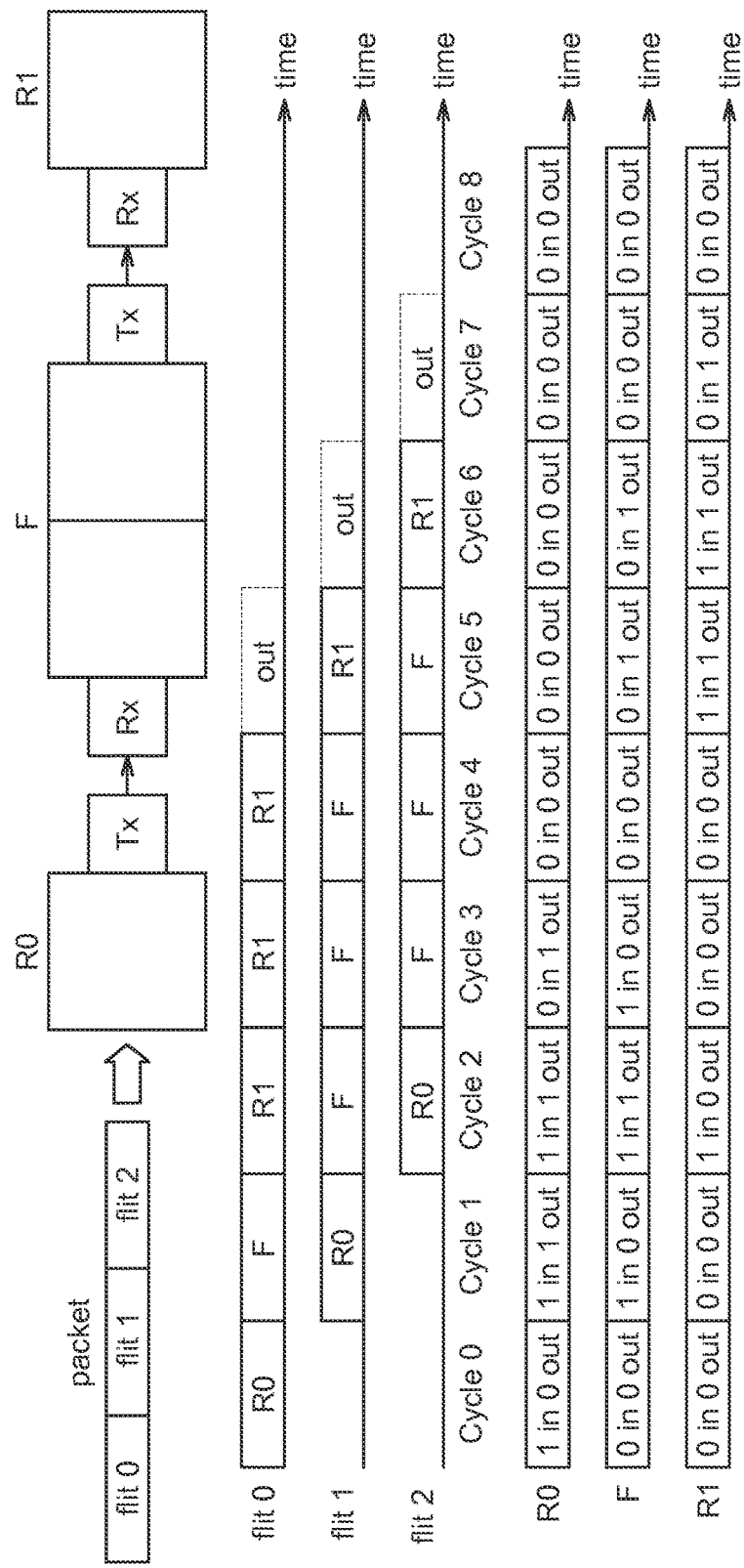
FIG. 16 is a schematic diagram of converting the transmission timing of the transmission unit into a power state according to an embodiment of the disclosure.

FIG. 16 is a schematic diagram of converting the transmission timing of the transmission unit into the power state according to an embodiment of the disclosure. As indicated in FIG. 16, the transmission of a packet having 3 transmission units is taken for example. Suppose the routing path of the packet is router R0→buffer F (having a depth of 2)→router R1.

The timing at which each transmission unit queued in the router R0 and/or the buffer F and/or the router R1 may be summarized to form a timing diagram as indicated in FIG. 16. During cycle 0, the first transmission unit "flit 0" enters the router R0, but the second transmission unit "flit 1" and the third transmission unit "flit 3" have not yet entered the router R0. Therefore, during cycle 0, the router R0 is 1 in 0 out; the buffer F is 0 in 0 out; and the router R1 is 0 in 0 out. That is, in an embodiment of the disclosure, the time ($t_{stage[0]flit[0]}$) at which the first transmission unit "flit 0" enters the router R0 is obtained, and thus the circuit states of the router R0, the buffer F and the router R1 may be obtained.

During cycle 1, respective transmission timings of the transmission units "flit 0" and "flit 1" are obtained. It may be known that the first transmission unit "flit 0" enters the buffer F; the second transmission unit "flit 1" enters the router R0; but the third transmission unit "flit 2" has not yet entered the router R0. Therefore, during cycle 1, based on respective transmission timings of transmission unit "flit 0" and transmission unit "flit 1", it may be determined that the router R0 is 1 in 1 out; the buffer F is 1 in 0 out; and the router R1 is 0 in 0 out. Similarities may be obtained by analogy.

The above elaboration is exemplified by the transmission of a packet. Complete power states may be obtained after considering/summing the power states of transmitting the packets in the NoC.

The power model maps the "power state" to the "power". In an embodiment of the disclosure, the power is expressed as following equations:

$$P_{NoC} = \Sigma P_{router} + \Sigma P_{buffer} \quad (3.1)$$

$$P_{router} = F_{router}(\bar{s}_{router}) \quad (3.2)$$

$$P_{buffer} = F_{buffer}(\bar{s}_{buffer}) \quad (3.3)$$

$P_{NoC}$ represents overall power consumption of the entire NoC, obtained by summing up total power consumption ($P_{router}$) of all routers and total power consumption ($P_{buffer}$) of all buffers. In another embodiment, power consumption of the NoC is obtained by summing up the power consumption ($P_{router}$) of some routers and the power consumption ($P_{buffer}$) of some buffers.

Functions $F_{router}$ and $F_{buffer}$ respectively are power model functions of the router and the buffer. $\bar{s}_{router}$ and $\bar{s}_{buffer}$ respectively are power states of the router and the buffer.

The power model may be implemented in different ways such as look up table or equations (linear and/or non-linear equations). The power models realized by look up table and by linear equation are respectively elaborated below.

The buffer power model realized by the look-up-table approach is applicable to mutually exclusive power states (i.e. these power states do not occur at the same time). Each power state corresponds to a power value. For instance, based on the power state of the buffer as indicated in Table 1 (implementation 1), a power index table as indicated in Table 5 may be obtained. Similarly, the power model corresponding to the power state of buffer/router (implementation 2, 3, 4) may also be realized by the look-up-table approach.

TABLE 5

| Is buffer written | Is buffer read | Power state | Power |
|---|---|---|---|
| F | F | S0_BUFFER_1 | P0_BUFFER_1 |
| F | T | S1_BUFFER_1 | P1_BUFFER_1 |
| T | F | S2_BUFFER_1 | P2_BUFFER_1 |
| T | T | S3_BUFFER_1 | P3_BUFFER_1 |

In addition, the power model may also be realized by linear equations in an embodiment of the disclosure. For instance, let the power state of the router be taken for example (in implementation 4, the circuit state of the router is determined according to whether the receive port of the router is written and whether the transmit port of the router is read), the power states of each receive port and each transmit port may be obtained by looking up Table 4, and are encoded as [Rx0, Rx1, Rx2, Rx3, Rx4, Tx0, Tx1, Tx2, Tx3, Tx4]. "Rx0" represents the coding of the power state of the receive port Rx0 at the current clock cycle, and so on.

The power model of the router is expressed as:

$$P_{router} = p_{static} + \Sigma_{i=0}^{4} Rx_i \times p_{Rx_i} + \Sigma_{i=0}^{4} Tx_i \times p_{Tx_i} \quad (4)$$

Wherein, $p_{static}$ represents static power; $p_{Rx_i}$ represents power increase caused by the write operation of $Rx_i$; and $p_{Tx_i}$ represents power increase caused by the read operation of $Tx_i$.

Based on the descriptions of the above embodiment, in an embodiment of the disclosure, (1) the transmission timings of each transmission unit of the packet are estimated; (2) the power state (the power state of the router and/or the power state of the buffer) of each element of the NoC is estimated according to the transmission timings of each transmission; and (3) the power consumption of the NoC in each clock cycle is estimated according to each element power state.

Figure 17:
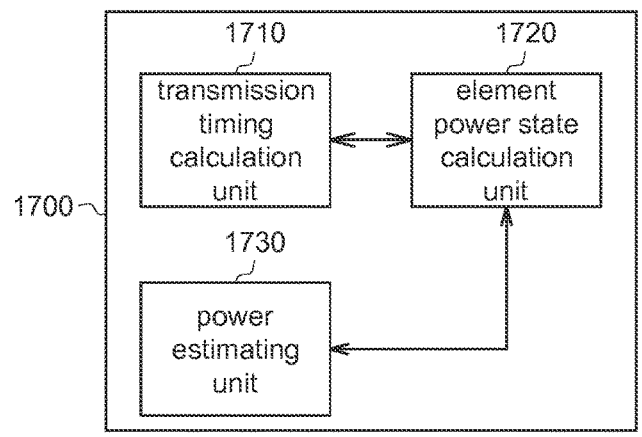
FIG. 17 is a functional block diagram of a NoC timing power estimating device according to an embodiment of the disclosure.

Also, an embodiment of the disclosure further discloses a NoC timing power estimating device as indicated in FIG. 17. As indicated in FIG. 17, the timing power estimating device 1700 at least includes a transmission timing calculation unit 1710, an element power state calculation unit 1720, and a power estimating unit 1730. The transmission timing calculation unit 1710 calculates respective transmission timing of each transmission unit of the packet at which the transmission units enter/leave each traversed element. The element power state calculation unit 1720 obtains respective power state of each traversed element according to respective transmission timing of each transmission unit. The power estimating unit 1730 estimates power consumption of the NoC at each clock cycle according to respective power states of each traversed element. Implementation details of the units 1710-1730 are the same or similar to those disclosed above and are not repeated here. Moreover, the units 1710-1730 may be realized by an integrated circuits or by at least a processor. That is the units 1710-1730 may be realized by software, hardware or firmware, which is still within the spirit of the disclosure.

In regard of the pipelined router micro-architecture, the operations of the router may be divided into 5 stages: link traversal and input buffering (LT&IB), route calculation (RC), virtual channel allocation (VCA), switch allocation (SA), and switch traversal and output buffering (ST&OB). The router micro-architecture may implement a register (Reg) during the operation stage to increase operation frequency by interrupting key path on the circuit.

Figure 18A:
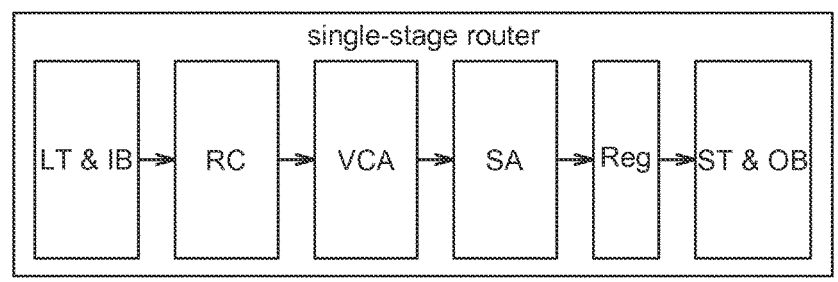
FIG. 18A is a schematic diagram of a possible single-cycle router architecture according to an embodiment of the disclosure.
Figure 18B:
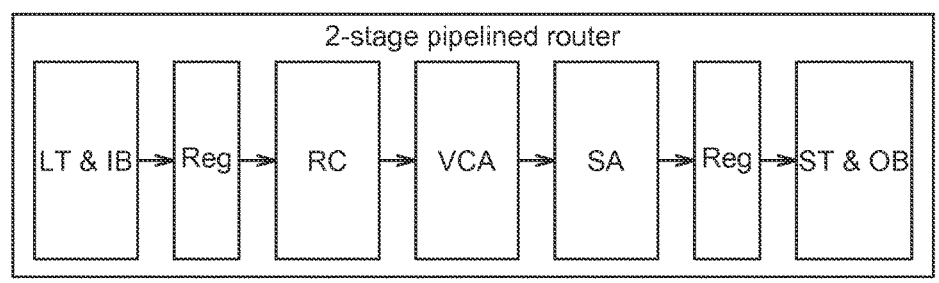
FIG. 18B is a schematic diagram of a possible 2-stage pipelined router according to an embodiment of the disclosure.

In the embodiments of the disclosure, the timing equations will be different if different router micro-architectures are applied. FIG. 18A is a schematic diagram showing a possible single-cycle router architecture (which may use the equations (1) and (2) disclosed above) of an embodiment of the disclosure. FIG. 18B is a schematic diagram of a possible 2-stage pipelined router (which may use equations (5) and (6) below) of an embodiment of the disclosure. Detailed descriptions of equations (5) and (6) are elaborated below respectively.

The equation (5) includes equations (5.1) and (5.2)

| Header arrival time of stage[i] |
|---|
| if $(t_{stage[i-1]flit[0]} + \Delta t_{passFIFO} \leq t_{stage[i]release})$ <br> $t_{stage[i]flit[0]} = t_{stage[i]release} + \text{clk}_{stage[i]}$ (5.1) <br> else <br> $t_{stage[i]flit[0]} = t_{stage[i-1]flit[0]} + \Delta t_{passFIFO} + \text{clk}_{stage[i]}$ (5.2) |

The equation (5.1) is the same as the equation (1.1).

The equation (5.2) represents, if no congestion, the time at which the transmission unit flit[0] enters the router stage[i] (the time at which the last stage register of the router stage[i] samples the transmission unit) is equivalent to a sum of following 3 items: (i) the time ($t_{stage[i-1]flit[0]}$) at which the transmission unit flit[0] enters the previous router stage[i−1]; (ii) the time ($\Delta t_{passFIFO}$) required for the transmission unit to pass through the buffer; and (iii) the length of a clock cycle of the router stage[i] (in the present example, the time required for passing through the first stage register). That is, if no congestion, equation (5.2) is used for obtaining the time $t_{stage[i]flit[0]}$ at which the header (flit[0]) of the packet enters the router stage[i].

In an embodiment of the disclosure, equation (6) is used for obtaining the time ($t_{stage[i]flit[j]}$) at which subsequent transmission units flit[j] (j=1, 2, . . . ) of the packet enters the router stage[i] (the time $t_{stage[i]flit[j]}$ also referred as the j-th transmission unit entering time).

The equation (6) includes equations (6.1), (6.2) and (6.3)

| flit[j] arrival time of stage[i] |
|---|
| $t_{stage[i]flit[j]} = t_{stage[i]flit[j-1]} + k \times \text{clk}_{stage[i]}$, where k = 1, 2,... (6.1) <br> $t_{stage[i]flit[j]} \geq t_{stage[i-1]flit[j]} + \Delta t_{passFIFO}$ (6.2) <br> $t_{stage[i]flit[j]} \geq t_{stage[i+1]flit[j-d-2]} + \Delta t_{synFIFO}$ (6.3) |

The equations (6.1) and (6.2) are the same as equations (2.1) and (2.2).

The physical meaning of the equation (6.3) is: if the buffer (having a depth of d) between the router stage[i] and the router stage[i+1] is full (that is, the transmission units flit[j−2], flit[j−d−1] are queued in the buffer) and at the same time the flit[j−d−2] is queued in the first pipeline register stage of the stage[i+1], the transmission unit flit[j−1] will be blocked at the second the pipeline register stage of the router stage[i]. Therefore, the time $t_{stage[i]flit[j]}$ at which the transmission unit flit[j] enters the router stage[i] is greater than (≥) a sum of the time $t_{stage[i+1]flit[j-d-2]}$ at which the transmission unit flit[j−d−2] enters the router stage[i+1] plus the time ($\Delta t_{synFIFO}$) at which the transmission unit flit[j−1] is allowed to be written to the buffer. The basic concepts of the 2-stage pipelined router of the present example are the same as that of the single-cycle router except that the 2-stage pipelined router has two pipeline register stages, and accordingly the transmission unit flit[j−d−2] may be additionally buffered.

Figure 19A:
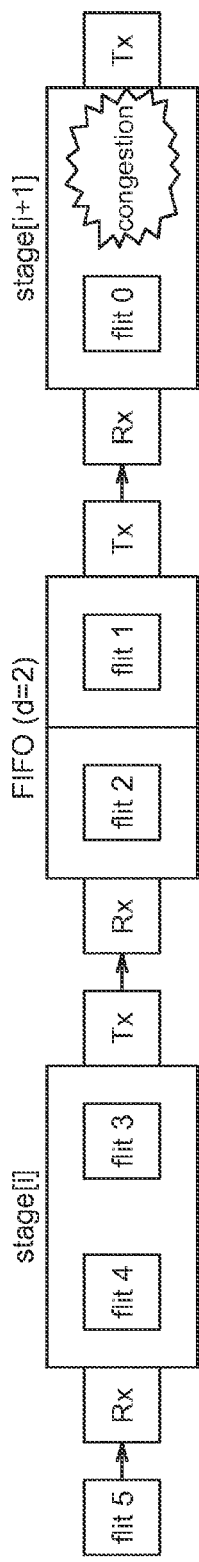
FIGS. 19A-19C are schematic diagrams of calculating the time $t_{stage[i]flit[j]}$ at which the transmission unit flit[j] enters the router stage[i] in a 2-stage pipelined router architecture when buffer (such as a first-in-first-out (FIFO) buffer) is full according to an embodiment of the disclosure.
Figure 19B:
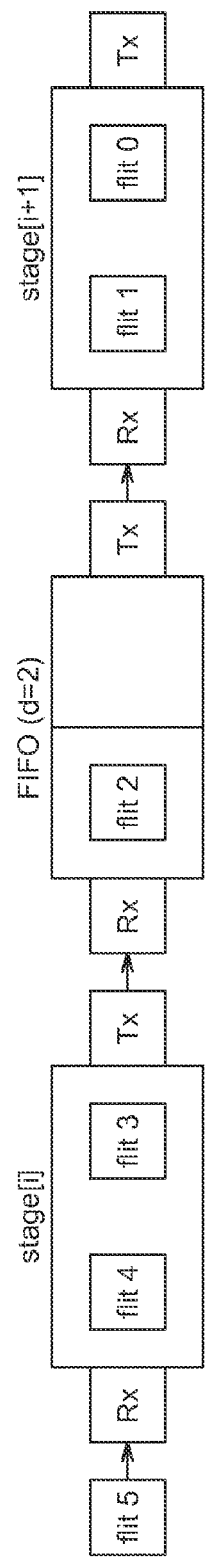
Figure 19C:
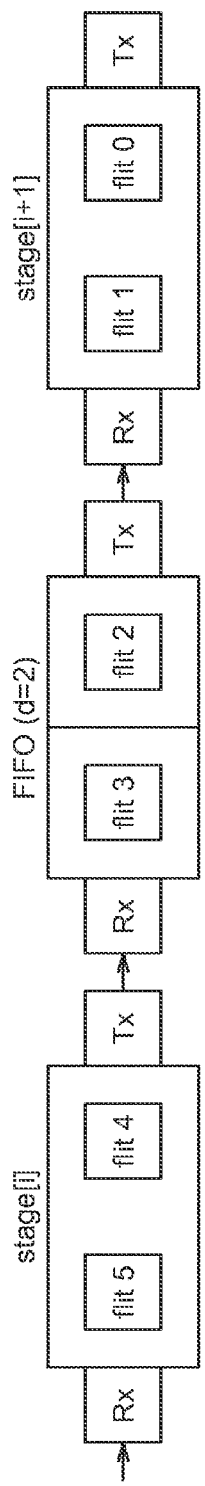

FIGS. 19A-19C are schematic diagrams of calculating the time $t_{stage[i]flit[j]}$ at which the transmission unit flit[j] enters the router stage[i] if the buffer is full according to an embodiment of the disclosure (used in a 2-stage pipelined router architecture, that is, the router has two pipeline register stages). As indicated in FIG. 19A, the initial state represents the buffer is full, the input side of the router stage[i+1] is also occupied, and hence congestion occurs. As indicated in FIG. 19B, after the second pipeline register stage of the router stage[i+1] is released, the transmission unit "flit 0" is written to the second stage register from the first stage register of the stage[i+1] and at the same time, the transmission unit "flit 1" is written to the first stage register of the router stage[i+1] from the buffer. Therefore, the buffer releases a storage space. As indicated in FIG. 19C, the transmission unit "flit 4" is allowed to be written to the router stage[i].

From the above descriptions, the embodiments of the disclosure are suitable to system level analysis on dynamic power of large scale NoC (which may include tens or hundreds of routers). Moreover, in an embodiment of the disclosure, the power analysis may reach clock cycle accuracy, and dynamic estimation of the NoC timing power is quick. That is because the embodiment of the disclosure obtains the NoC timing power by equation solution, and thus the embodiment of the disclosure is capable of quickly and dynamic estimating the NoC timing power.

It will be apparent to those skilled in the art that various modifications and variations may be made to the disclosed embodiments. It is intended that the specification and examples be considered as exemplary only, with a true scope of the disclosure being indicated by the following claims and their equivalents.

What is claimed is:

1. A network-on-chip (NoC) timing power estimating method, comprising:
   estimating a plurality of transmission timings of a plurality of transmission units of at least a packet, the transmission timings indicating respective time points at which the transmission units enter/leave a plurality of traversed elements of the NoC;
   estimating respective circuit states and respective power states of the traversed elements of the NoC according to the transmission timings of the transmission units, wherein the circuit state indicates an operation state of the traversed element, and the power state is related to the circuit state; and
   estimating power consumption of the NoC according to the power states of the traversed elements of the NoC, wherein the step of estimating the transmission timings of the transmission units comprises:
   determining a routing path of the packet;
   performing arbitration to determine which packet gains a channel usage right if a plurality of routing paths of a plurality of packets conflict;
   calculating the transmission timings of the transmission units; and
   calculating a release timing of the channel usage right to obtain a usage timing at which another packet gains the channel usage right; and
   wherein whether a congestion occurs is determined based on a buffer passing time and a buffer allowed write time, the buffer passing time being required for one of the transmission units of the packet to pass through a buffer, and the buffer allowed write time being between when one of the transmission units of the packet is read from the buffer and when a next transmission unit of the transmission units of the packet is written to the buffer.

2. The timing power estimating method according to claim 1, wherein, the step of estimating the transmission timings of the transmission units further comprises:
   determining the routing path of the packet according to at least a packet parameter and a routing parameter of the NoC;
   and
   updating the circuit of the traversed elements.

3. The timing power estimating method according to claim 2, wherein,
   according to whether the routing parameter is a dynamic routing or a static routing, determining whether update of the circuit states of the traversed elements affects the routing path of the packet.

4. The timing power estimating method according to claim 2, wherein, the step of calculating the transmission timings of the transmission units comprises:
   determining the release timing ($t_{stage[i]release}$) at which an i-th router stage[i] is is released by the packet, wherein "i" is a positive integer;
   determining the buffer passing time ($\Delta t_{passBUFFER}$) required for one of the transmission units of the packet to pass through the buffer if no congestion;
   determining, when the buffer is full, the buffer allowed write time ($\Delta t_{syncBUFFER}$) between when one of the transmission units of the packet is read from the buffer and when the next transmission unit of the transmission units of the packet is written to the buffer; and
   determining whether the congestion occurs.

5. The timing power estimating method according to claim 4, wherein, the step of determining whether the congestion occurs comprises:
   determining a sum of a first header entering time ($t_{stage[i-1]flit[0]}$) at which a header transmission unit flit[0] of the packet enters an (i−1)-th router stage[i−1] plus the buffer passing time ($\Delta t_{passBUFFER}$) required for the header transmission unit flit[0] to pass through the buffer; and
   comparing the sum with the release timing ($t_{stage[i]release}$) at which the i-th router stage[i] is released, to determine whether the congestion occurs.

6. The timing power estimating method according to claim 5, wherein, in a single-cycle router architecture,
   if the congestion occurs, it is determined that a second header entering time ($t_{stage[i]\_flit[0]}$) at which the header transmission unit flit[0] enters the i-th router stage[i] is equivalent to a sum of the release timing ($t_{stage[i]release}$) at which the i-th router stage[i] is released plus a clock cycle;
   if the congestion does not occur, it is determined that the second header entering time ($t_{stage[i]flit[0]}$) at which the header transmission unit flit[0] enters the i-th router stage[i] is equivalent to the first header entering time ($t_{stage[i-1]flit[0]}$) at which the header transmission unit flit[0] enters the (i−1)-th router stage[i−1] plus the buffer passing time ($\Delta t_{passFIFO}$) required for the header transmission unit flit[0] to pass through the buffer.

7. The timing power estimating method according to claim 6, wherein, in the single-cycle router architecture, a j-th transmission unit entering time ($t_{stage[i]flit[j]}$) at which a j-th transmission unit flit[j] of the packet enters the i-th router stage[i] satisfies following conditions, wherein "j" is a positive integer:
the j-th transmission unit entering time ($t_{stage[i]flit[j]}$) is equivalent to a sum of a (j−1)-th transmission unit entering time (tstage[i]flit[j−1]) at which a (j−1)-th transmission unit (flit[j−1]) of the packet enters the i-th router stage[i] plus k clock cycles $clk_{stage[i]}$ of the i-th router stage[i], wherein "k" is a positive integer;
the j-th transmission unit entering time ($t_{stage[i]flit[j]}$) at which the j-th transmission unit flit[j] of the packet enters the i-th router stage[i] is greater than a sum of a time ($t_{stage[i−1]flit[j]}$) at which the j-th transmission unit flit[j] enters the (i−1)-th router stage[i−1] plus the buffer passing time ($\Delta t_{passFIFO}$) required for the j-th transmission unit flit[j] to pass through the buffer; and
if the buffer having a depth of "d" is full, it is determined that the j-th transmission unit time ($t_{stage[i]flit[j]}$) at which the j-th transmission unit flit[j] enters the i-th router stage[i] is greater than a sum of a time ($t_{stage[i+1]flit[j−d−1]}$) at which a (j−d−1)-th transmission unit flit[j−d−1] enters an (i+1)-th router stage[i+1] plus the buffer allowed write time ($\Delta t_{syncFIFO}$) which the (j−1)-th transmission unit flit[j−1] is allowed to be written to the buffer, wherein "d" is a positive integer.

8. The timing power estimating method according to claim 5, wherein, in a 2-stage router architecture,
if the congestion occurs, it is determined that a second header entering time ($t_{stage[i]flit[0]}$) at which the header transmission unit flit[0] enters the i-th router stage[i] is equivalent to a sum of the release timing ($t_{stage[i]release}$) at which the i-th router stage[i] is released plus a clock cycle; and
if the congestion does not occur, it is determined that the second header entering time ($t_{stage[i]flit[0]}$) at which the header transmission unit flit[0] enters the i-th router stage[i] is equivalent to a sum of the first header entering time ($t_{stage[i−1]flit[0]}$) at which the header transmission unit flit[0] enters the (i−1)-th router stage[i−1] plus the buffer passing time ($\Delta t_{passFIFO}$) required for the header transmission unit flit[0] to pass through the buffer and further plus the clock cycle.

9. The timing power estimating method according to claim 8, wherein, in the 2-stage router architecture,
a j-th transmission unit entering time ($t_{stage[i]flit[j]}$) at which a j-th transmission unit flit[j] of the packet enters the i-th router stage[i] satisfies following conditions, wherein "j" is a positive integer:
the j-th transmission unit entering time ($t_{stage[i]flit[j]}$) is equivalent to a (j−1)-th transmission unit entering time (tstage[i]flit[j−1]) at which a (j−1)-th transmission unit (flit[j−1]) of the packet enters the i-th router stage[i] plus k clock cycles $clk_{stage[i]}$ of the i-th router stage[i], wherein "k" is a positive integer;
the j-th transmission unit entering time ($t_{stage[i]flit[j]}$) at which the j-th transmission unit flit[j] of the packet enters the i-th router stage[i] is greater than a sum of a time ($t_{stage[i−1]flit[j]}$) at which the j-th transmission unit flit[j] enters the (i−1)-th router stage[i−1] plus the buffer passing time ($\Delta t_{passFIFO}$) required for the j-th transmission unit flit[j] to pass through the buffer; and
if the buffer having a depth of "d" is full, it is determined that the j-th transmission unit time ($t_{stage[i]flit[j]}$) at which the j-th transmission unit flit[j] enters the i-th router stage[i] is greater than a sum of a time ($t_{stage[i+1]flit[j−d−1]}$) at which a (j−d−2)-th transmission unit flit[j−d−2] enters an (i+1)-th router stage[i+1] plus the buffer allowed write time ($\Delta t_{synFIFO}$) at which the (j−1)-th transmission unit flit[j−1] is allowed to be written to the buffer, wherein "d" is a positive integer.

10. The timing power estimating method according to claim 1, wherein, the step of estimating the circuit states and the power states of the traversed elements of the NoC comprises:
if one of the traversed elements is a buffer, determining a power state of the traversed element according to whether the buffer is written and whether the buffer is read; or
if one of the traversed elements is the buffer, determining the power state of the traversed element according to whether the buffer is written, whether the buffer is read and a queue number in the buffer; or
if one of the traversed elements is a router, determining the power state of the traversed element according to a write number and a read number of the router; or
if one of the traversed elements is the router, determining the power state of the traversed element according to whether respective receive port of the router is written and whether respective transmit port of the router is read.

11. The timing power estimating method according to claim 1, wherein, the step of estimating the power consumption of the NoC comprises:
using a power model look-up-table to obtain respective power consumption of the traversed elements based on the power states of the traversed elements, and summing up the power consumption to estimate the power consumption of the NoC; or
using an equation to obtain respective power consumption of the traversed elements based on the power states of the traversed elements, and summing up the power consumption to estimate the power consumption of the NoC.

12. A network-on-chip (NoC) timing power estimating device, comprising:
a transmission timing calculation unit for estimating a plurality of transmission timings of a plurality of transmission units of at least a packet, the transmission timings indicating respective time points at which the transmission units enter/leave a plurality of traversed elements of the NoC;
an element power state calculation unit for estimating respective circuit states and respective power states of the traversed elements of the NoC according to the transmission timings of the transmission units, wherein the circuit state indicates an operation state of the traversed element, and the power state is related to the circuit state; and
a power estimating unit for estimating power consumption of the NoC according to the power states of the traversed elements of the NoC, wherein the transmission timing calculation unit is configured for:
  determining a routing path of the packet;
  performing arbitration to determine which packet gains a channel usage right if a plurality of routing paths of a plurality of packets conflict;
  calculating the transmission timings of the transmission units; and
  calculating a release timing of the channel usage right to obtain a usage timing at which another packet gains the channel usage right; and
wherein the transmission timing calculation unit is configured for: determining whether a congestion occurs based on a buffer passing time and a buffer allowed write time, the buffer passing time being required for one of the transmission units of the packet to pass through a buffer, and the buffer allowed write time being between when one of the transmission units of the packet is read from the buffer and when a next transmission unit of the transmission units of the packet is written to the buffer.

13. The timing power estimating device according to claim 12, wherein:
  the transmission timing calculation unit determines the routing path of the packet according to at least a packet parameter, and a routing parameter of the NoC; and
  the transmission timing calculation unit updates the circuit states of the traversed element.

14. The timing power estimating device according to claim 13, wherein,
  the transmission timing calculation unit determines whether update of the circuit states of the traversed elements affects the routing path of the packet according to whether the routing parameter is a dynamic routing or a static routing.

15. The timing power estimating device according to claim 13, wherein:
  the transmission timing calculation unit calculates the release timing ($t_{stage[i]release}$) at which a i-th router stage[i] is released by the packet, wherein "i" is a positive integer;
  the transmission timing calculation unit determines the buffer passing time ($\Delta t_{passBUFFER}$) required for one of the transmission units of the packet to pass through the buffer if no congestion;
  the transmission timing calculation unit determines, when the buffer is full, the buffer allowed write time ($\Delta t_{syncBUFFER}$) between when one of the transmission units of the packet is read from the buffer and when the next transmission unit of the transmission units of the packet is written to the buffer; and
  the transmission timing calculation unit determines whether the congestion occurs.

16. The timing power estimating device according to claim 15, wherein:
  the transmission timing calculation unit calculates a sum of a first header entering time ($t_{stage[i-1]flit[0]}$) at which a header transmission unit flit[0] of the packet enters an (i−1)-th router stage[i−1] and the buffer passing time ($\Delta t_{passBUFFER}$) required for the header transmission unit flit[0] to pass through the buffer; and
  the transmission timing calculation unit compares the sum with the release timing ($t_{stage[i]release}$) at which the i-th router stage[i] is released to determine whether the congestion occurs.

17. The timing power estimating device according to claim 16, wherein, in a single-cycle router architecture,
  if the congestion occurs, the transmission timing calculation unit determines that a second header entering time ($t_{stage[i]flit[0]}$) at which the header transmission unit flit[0] enters the i-th router stage[i] is equivalent to a sum of the release timing ($t_{stage[i]release}$) at which the i-th router stage[i] is released plus a clock cycle;
  if the congestion does not occur, the transmission timing calculation unit determines that the second header entering time ($t_{stage[i]flit[0]}$) at which the header transmission unit flit[0] enters the i-th router stage[i] is equivalent to a sum of the first header entering time ($t_{stage[i-1]flit[0]}$) at which the header transmission unit flit[0] enters the (i−1)-th router stage[i−1] plus the buffer passing time ($\Delta t_{passFIFO}$) required for the header transmission unit flit[0] to pass through the buffer.

18. The timing power estimating device according to claim 17, wherein, in the single-cycle router architecture,
  the transmission timing calculation unit determines that a j-th transmission unit entering time ($t_{stage[i]flit[j]}$) at which a j-th transmission unit flit[j] of the packet enters the i-th router stage[i] satisfies following conditions, wherein "j" is a positive integer:
    the j-th transmission unit entering time ($t_{stage[i]flit[j]}$) is equivalent to a sum of a (j−1)-th transmission unit entering time ($t_{stage[i]flit[j-1]}$) at which a (j−1)-th transmission unit (flit[j−1]) of the packet enters the i-th router stage[i] plus k clock cycles $clk_{stage[i]}$ of the i-th router stage[i], wherein "k" is a positive integer;
    the j-th transmission unit entering time ($t_{stage[i]flit[j]}$) at which the j-th transmission unit flit[j] of the packet enters the i-th router stage[i] is greater than a sum of a time ($t_{stage[i]flit[j]}$) at which the j-th transmission unit flit[j] enters the (i−1)-th router stage[i−1] plus the buffer passing time ($\Delta t_{passBUFFER}$) required for the j-th transmission unit flit[j] to pass through the buffer; and
    if the buffer having a depth of "d" is full, the j-th transmission unit time ($t_{stage[i]flit[j]}$) at which the j-th transmission unit flit[j] enters the i-th router stage[i] is greater than a sum of a time a ($t_{stage[i+1]flit[j-d-1]}$) at which a (j−d−1)-th transmission unit flit[j−d−1] enters a (i+1)-th router stage[i+1] plus the buffer allowed write time ($\Delta t_{synFIFO}$) at which the (j−1)-th transmission unit flit[j−1] is allowed to be written to the buffer, wherein "d" is a positive integer.

19. The timing power estimating device according to claim 16, wherein, in a 2-stage router architecture,
  if the congestion occurs, it is determined that a second header entering time ($t_{stage[i]flit[0]}$) at which the header transmission unit flit[0] enters the i-th router stage[i] is equivalent to a sum of the release timing ($t_{stage[i]release}$) at which the i-th router stage[i] is released plus a clock cycle;
  if the congestion does not occur, the second header entering time ($t_{stage[i]flit[0]}$) at which the header transmission unit flit[0] enters the i-th router stage[i] is equivalent to a sum of the first header entering time ($t_{stage[i-1]flit[0]}$) at which the header transmission unit flit[0] enters the (i−1)-th router stage[i−1] plus the buffer passing time ($\Delta t_{passFIFO}$) required for the header transmission unit flit[0] to pass through the buffer and further plus the clock cycle.

20. The timing power estimating device according to claim 19, wherein, in the 2-stage router architecture, a j-th transmission unit entering time ($t_{stage[i]flit[j]}$) at which a j-th transmission unit flit[j] of the packet enters the i-th router stage[i] satisfies following conditions, wherein "j" is a positive integer:
- the j-th transmission unit entering time ($t_{stage[i]flit[j]}$) is equivalent to a sum of a (j−1)-th transmission unit entering time (tstage[i]flit[j−1]) at which a (j−1)-th transmission unit (flit[j−1]) of the packet enters the i-th router stage[i] plus k clock cycles $clk_{stage[i]}$ of the i-th router stage[i], wherein "k" is a positive integer;
- the j-th transmission unit entering time ($t_{stage[i]flit[j]}$) at which the j-th transmission unit flit[j] of the packet enters the i-th router stage[i] is greater than a sum of a time ($t_{stage[i−1]flit[j]}$) at which the j-th transmission unit flit[j] enters the (i−1)-th router stage[i−1] plus the buffer passing time ($\Delta t_{passBUFFER}$) required for the j-th transmission unit flit[j] to pass through the buffer; and
- if the buffer having a depth of "d" is full, the j-th transmission unit time ($t_{stage[i]flit[j]}$) at which the j-th transmission unit flit[j] enters the i-th router stage[i] is greater than a sum of a time ($t_{stage[i+1]flit[j−d−1]}$) at which a (j−d−2)-th transmission unit flit[j−d−2] enters an (i+1)-th router stage[i+1] plus the buffer allowed write time ($\Delta t_{synFIFO}$) at which the (j−1)-th transmission unit flit[j−1] is allowed to be written to the buffer, wherein "d" is a positive integer.

21. The timing power estimating device according to claim 13, wherein the transmission timing calculation unit, the element power state calculation unit, and the power estimating unit are realized by at least an integrated circuit.

22. The timing power estimating device according to claim 12, wherein:
if one of the traversed elements is a buffer, the element power state calculation unit determines a power state of the traversed element according to whether the buffer is written and whether the buffer is read; or
if one of the traversed elements is the buffer, the element power state calculation unit determines the power state of the traversed element according to whether the buffer is written, whether the buffer is read and a queue number in the buffer; or
if one of the traversed elements is a router, the element power state calculation unit determines the power state of the traversed element according to a write number and a read number of the router; or
if one of the traversed elements is the router, the element power state calculation unit determines the power state of the traversed element according to whether respective receive port of the router is written and whether respective transmit port of the router is read.

23. The timing power estimating device according to claim 12, wherein:
the power estimating unit uses a power model look-up-table to obtain respective power consumption of the traversed elements based on the power states of the traversed elements and to sum up the power consumption to estimate the power consumption of the NoC; or
the power estimating unit uses an equation to obtain respective power consumption of the traversed elements based on the power states of the traversed elements, and to sum up the power consumption to estimate the power consumption of the NoC.

24. The timing power estimating device according to claim 12, wherein, the transmission timing calculation unit, the element power state calculation unit, and the power estimating unit are realized by at least a processor.

* * * * *